(12) United States Patent
Thomas et al.

(10) Patent No.: US 11,790,610 B2
(45) Date of Patent: Oct. 17, 2023

(54) SYSTEMS AND METHODS FOR SELECTIVE IMAGE COMPOSITING

(71) Applicant: HOVER INC., San Francisco, CA (US)

(72) Inventors: Matthew Thomas, San Francisco, CA (US); Francisco Avila-Beltran, San Francisco, CA (US); David Royston Cutts, San Francisco, CA (US); William Castillo, San Francisco, CA (US); Giridhar Murali, San Francisco, CA (US); Brandon Scott, San Francisco, CA (US); Jeffrey Sommers, San Francisco, CA (US)

(73) Assignee: Hover Inc., San Francisco, CA (US)

( * ) Notice: Subject to any disclaimer, the term of this patent is extended or adjusted under 35 U.S.C. 154(b) by 142 days.

(21) Appl. No.: 17/094,311

(22) Filed: Nov. 10, 2020

(65) Prior Publication Data

US 2021/0142577 A1 May 13, 2021

Related U.S. Application Data

(60) Provisional application No. 63/070,816, filed on Aug. 26, 2020, provisional application No. 62/935,630,
(Continued)

(51) Int. Cl.
*G06T 19/00* (2011.01)
*G06T 3/00* (2006.01)
(Continued)

(52) U.S. Cl.
CPC .......... *G06T 19/006* (2013.01); *G06F 18/214* (2023.01); *G06T 3/0093* (2013.01);
(Continued)

(58) Field of Classification Search
CPC .... G06V 20/176; G06V 20/647; G06V 10/44; G06K 9/6256; G06T 19/006;
(Continued)

(56) References Cited

U.S. PATENT DOCUMENTS 5,937,105 A 8/1999 Katayama et al.
5,973,697 A 10/1999 Berry et al.
(Continued)

FOREIGN PATENT DOCUMENTS

WO 2011079241 A1 6/2011
WO 2011091552 A1 8/2011

OTHER PUBLICATIONS

PCT/US2020/059809, "International Search Report and Written Opinion", dated Apr. 13, 2021, 16 pages.
(Continued)

*Primary Examiner* — Sing-Wai Wu
(74) *Attorney, Agent, or Firm* — Kilpatrick Townsend & Stockton LLP

(57) ABSTRACT

Disclosed are techniques for generating a photorealistic image by augmenting or compositing at least a portion of a physical structure (e.g., a house) depicted in a two-dimensional (2D) image with synthetic image data. Additionally, disclosed are techniques for augmenting the depicted physical structure using a minimum amount of three-dimensional (3D) geometric data and applying a scene effect to the synthetic image data to create a photorealistic effect.

20 Claims, 14 Drawing Sheets

Related U.S. Application Data filed on Nov. 14, 2019, provisional application No. 62/933,939, filed on Nov. 11, 2019.

(51) Int. Cl.
| | | |
|---|---|---|
| *G06T 17/20* | (2006.01) | |
| *G06T 19/20* | (2011.01) | |
| *G06V 20/64* | (2022.01) | |
| *G06V 20/10* | (2022.01) | |
| *G06F 18/214* | (2023.01) | |

(52) U.S. Cl.
CPC .............. *G06T 17/20* (2013.01); *G06T 19/20* (2013.01); *G06V 20/176* (2022.01); *G06V 20/647* (2022.01); *G06T 2219/2024* (2013.01)

(58) Field of Classification Search
CPC ....... G06T 3/0093; G06T 17/20; G06T 19/20; G06T 2219/2024; G06T 17/00
See application file for complete search history.

(56) References Cited

U.S. PATENT DOCUMENTS

| | | |
|---|---|---|
| 6,587,601 B1 | 7/2003 | Hsu et al. |
| 6,621,921 B1 | 9/2003 | Matsugu et al. |
| 7,199,793 B2 | 4/2007 | Oh et al. |
| 7,218,318 B2 | 5/2007 | Shimazu |
| 7,728,833 B2 | 6/2010 | Verma et al. |
| 7,814,436 B2 | 10/2010 | Schrag et al. |
| 8,040,343 B2 | 10/2011 | Kikuchi et al. |
| 8,098,899 B2 | 1/2012 | Ohashi |
| 8,339,394 B1 | 12/2012 | Lininger |
| 8,350,850 B2 | 1/2013 | Steedly et al. |
| 8,390,617 B1 | 3/2013 | Reinhardt |
| 8,466,915 B1 | 6/2013 | Frueh |
| 8,970,579 B2 | 3/2015 | Muller et al. |
| 9,098,926 B2 | 8/2015 | Quan et al. |
| 9,129,432 B2 | 9/2015 | Quan et al. |
| 2003/0014224 A1 | 1/2003 | Guo et al. |
| 2004/0066454 A1 | 4/2004 | Otani et al. |
| 2004/0105573 A1 | 6/2004 | Neumann et al. |
| 2004/0196282 A1 | 10/2004 | Oh |
| 2007/0110338 A1 | 5/2007 | Snavely et al. |
| 2007/0237420 A1* | 10/2007 | Steedly ................. G06V 10/24 382/284 |
| 2010/0284607 A1* | 11/2010 | Van Den Hengel .... G06T 7/564 382/154 |
| 2015/0029182 A1 | 1/2015 | Sun et al. |
| 2015/0317821 A1* | 11/2015 | Ding ......................... G06T 7/11 345/420 |
| 2018/0268614 A1* | 9/2018 | Byers ..................... G06T 15/20 |
| 2019/0026958 A1 | 1/2019 | Gausebeck et al. |
| 2019/0080467 A1 | 3/2019 | Hirzer et al. |
| 2021/0279811 A1 | 9/2021 | Waltman et al. |

OTHER PUBLICATIONS

PCT/US2020/059809, "Invitation to Pay Additional Fees and, Where Applicable, Protest Fee", dated Feb. 23, 2021, 12 pages.
PCT/US2020/059809, "International Preliminary Report on Patentability", dated May 27, 2022, 11 pages.
CA3157749, "Office Action", dated Jun. 20, 2023, 4 pages.

\* cited by examiner

SYSTEMS AND METHODS FOR SELECTIVE IMAGE COMPOSITING

CROSS-REFERENCES TO RELATED APPLICATIONS

This application claims the priority benefit of U.S. Provisional Patent Application No. 62/933,939, filed on Nov. 11, 2019, U.S. Provisional Patent Application No. 62/935,630, filed on Nov. 14, 2019, and U.S. Provisional Patent Application No. 63/070,816, filed on Aug. 26, 2020, the disclosures of each of which are incorporated by reference herein in their entirety for all purposes.

FIELD OF THE INVENTION

The present disclosure generally relates to techniques for generating a photorealistic image by augmenting or compositing at least a portion of a physical structure (e.g., a house) depicted in a two-dimensional (2D) image with synthetic image data. More specifically, the present disclosure relates to techniques for augmenting the depicted physical structure using a minimum amount of three-dimensional (3D) geometric data and applying a scene effect to the synthetic image data to create a photorealistic effect. Additionally, the present disclosure relates to techniques for automatically determining a surface orientation of a facet of the depicted physical structure, for example, for the purpose of projecting the synthetic image data onto the depicted physical structure to create the photorealistic effect.

RELATION TO OTHER APPLICATIONS

This application is related to U.S. patent application Ser. No. 14/339,127 filed on Jul. 23, 2014 and issued as U.S. Pat. No. 9,437,033, and U.S. patent application Ser. No. 15/411,226 filed on Jan. 20, 2017; the disclosure of each of which are hereby incorporated by reference in their entirety for all purposes.

This application is also related to each of the following applications: U.S. patent application Ser. No. 12/265,656, now issued as U.S. Pat. No. 8,422,825, filed on Nov. 5, 2008; U.S. patent application Ser. No. 14/339,127, now issued as U.S. Pat. No. 9,437,033, filed on Jul. 23, 2014; and U.S. patent application Ser. No. 15/025,132, filed on Oct. 24, 2014. The disclosure of each of the above-identified applications are incorporated by reference herein in their entirety for all purposes.

BACKGROUND OF THE INVENTION

Physical structures, such as houses, can be represented virtually using 3D models for a variety of purposes. For example, the 3D model of a house can be generated, and various portions of the 3D model can be replaced or supplemented to preview how structural or aesthetic modifications to the house would look in the real world. To illustrate, a roof of a 3D model of a house can be augmented to preview how a new roof shingle would look. Augmenting a 3D model often involves first generating a complete 3D model representing the structural features of the physical structure. After the complete 3D model is generated, then a portion of the complete 3D model can be modified to represent the proposed new structural features (e.g., a garage added to a house) or aesthetic features (e.g., new paint color). However, generating a complete 3D model before augmenting a portion of the 3D model can be unnecessarily burdensome on processing resources and increase the image rendering time.

Additionally, techniques for constructing digital 3D models from external image sources produce virtual representations that despite the enhanced spatial data conveyed, possess lower visual fidelity than the original external images because the rendering environment of a computer is not a perfect replication of the real-world environment in the external image. Further, the contextual information of the external image sources is often not provided to the rendering environment during the reconstruction of 3D models, which further contributes to the lower visual fidelity of the virtual representations. Thus, the modifications that are synthetically applied to the physical structure are often depicted in an unrealistic manner.

BRIEF SUMMARY OF THE INVENTION

In some embodiments, a computer-implemented method is provided. The computer-implemented method may include receiving a two-dimensional (2D) image and metadata. The 2D image may include a set of pixels depicting a physical structure captured by an image capturing device. The metadata may represent one or more characteristics of the image capturing device. The computer-implemented method may also include identifying a portion of the 2D image to augment with synthetic image data. The computer-implemented method may include generating a reference 3D model of the physical structure from the 2D image. For example, the reference 3D model may include a block or planar geometry without any texture data, or 3D keypoints arranged in the virtual space to represent planar vertices of the physical structure. In some examples, the reference 3D model may represent the minimum amount of 3D geometric data needed to represent the physical structure in a virtual space. The reference 3D model may represent the identified portion of the 2D image in the virtual space. Generating the reference 3D model may include determining a 3D orientation of a 3D planar surface of the reference 3D model. As only a non-limiting example, the 3D planar surface may be associated with the roof of a house depicted in the 2D image. The computer-implemented method may also include applying the synthetic image data onto the reference 3D model. The computer-implemented method may include rendering a photorealistic image using the 2D image, the metadata, and the synthetic image data applied to the reference 3D model. The photorealistic image may depict the physical structure augmented by the synthetic image data at the identified portion of the 2D image. Other embodiments of this aspect include corresponding computer systems, apparatus, and computer programs recorded on one or more computer storage devices, each configured to perform the actions of the methods.

In some embodiments, a system is provided that includes one or more processors and a non-transitory computer readable storage medium containing instructions which, when executed on the one or more processors, cause the one or more data processors to perform part or all of one or more methods or processes disclosed herein.

In some embodiments, a computer-program product is provided that is tangibly embodied in a non-transitory, machine-readable storage medium and that includes instructions configured to cause one or more processors to perform part or all of one or more methods disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the disclosure claimed. Thus, it should be understood that although the present disclosure as claimed has been specifically disclosed by embodiments and optional features, modification and variation of the concepts herein disclosed may be resorted to by those skilled in the art, and that such modifications and variations are considered to be within the scope of this invention as defined by the appended claims.

BRIEF DESCRIPTION OF THE DRAWINGS

The present disclosure is described in conjunction with the appended figures.

Figure 1A:
FIGS. 1A-1B illustrate views of a physical structure in a 2D captured image and a 3D reconstructed model of the physical structure, according to some aspects of the present disclosure.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Certain aspects and features of the present disclosure relate to techniques for generating a photorealistic (e.g., composite) image depicting a physical structure (e.g., a house) augmented with synthetic image data. Techniques described herein further relate to generating the photorealistic image using a minimum amount of 3D geometric data (e.g., referred to interchangeably as a "reference geometry"). The minimum amount of 3D geometric data represents the least amount of 3D geometric data needed to model the physical structure in a virtual space. For example, the minimum amount of 3D geometric data can include a block or planar geometry without any texture data, or 3D keypoints arranged in the virtual space to represent planar vertices of the physical structure. Thus, the minimum amount of geometric data represents a simpler virtual construct as compared to a full 3D model of the physical structure. A photorealistic image can depict synthetic image data rendered over a 2D image of a real-world physical structure. The synthetic image data can represent, for example, any computer-generated object, pattern, or design that can be depicted visually. 3D geometric data can include any data used to represent structural features of the physical structure in three dimensions and in a virtual space. Non-limiting examples of 3D geometric data can include 3D point clouds, polygon meshes, depth maps, multi-view images, voxels, and other suitable 3D geometric data. Generating a minimum amount of 3D geometric data to construct a simpler 3D model of at least a portion of a depicted physical structure improves the performance of image processing using computing resources.

According to certain implementations of the present disclosure, a computer system can be configured to generate a photorealistic image of the physical structure by receiving a 2D image depicting the physical structure and identifying a portion of the depicted physical structure to be replaced or supplemented with synthetic image data. Further, the computer system can be configured to detect a minimum amount of 3D geometric data needed to construct a virtual 3D model that represents the identified portion of the depicted physical structure. In some implementations, the computer system can execute a trained machine-learning model having been trained to generate a minimum geometry (e.g., a reference 3D model that represents the minimum amount of 3D geometric data needed to virtually represent a portion of a 2D image) representing the portion of the depicted physical structure targeted to be replaced or supplemented with synthetic image data.

In some implementations, one or more image segmentation techniques can be executed to segment the set of pixels of the 2D image into subsets of pixels. The segmentation techniques can be executed to classify each pixel of the 2D image into one of the segmented subsets of pixels. Further, each subset of the set of pixels can be associated with a particular structural feature of the physical structure. For example, one subset of pixels can represent the roof of a house, whereas, another subset of pixels can represent a façade of the house. The computer system can be configured to select the subset of pixels that correspond to the identified portion of the 2D image. Non-limiting examples of image segmentation techniques can include region-based segmentation, edge detection segmentation, image segmentation based on clustering, deep neural network-based segmentation (e.g., Mask R-CNN), and other suitable image segmentation techniques.

In some examples, the computer system can also be configured to predict a surface normal orientation of a plane associated with a surface depicted in the 2D image (e.g., the surface being a roof of a house depicted in the 2D image). The computer system can then perform a boundary fill function using synthetic image data, such as a digital swatch or collection of pixels visually sampling a texture material, to fill a closed boundary of the selected subset of pixels with the synthetic image data modified (e.g., warped) according to the predicted surface normal orientation. To illustrate, the closed boundary of a roof depicted in the 2D image is defined by the pixels representing edges of the roof. The computer system generates an estimated pitch of the depicted roof directly from the 2D image using image processing techniques disclosed, for example, with respect to FIG. 9A through FIG. 14.

In some implementations, the computer system can receive a 3D point cloud representing the structural features of the physical structure. For example, the 3D point cloud can be generated using a depth camera, such as a Light Detection and Ranging (LiDAR) image capturing device. The computer system can execute one or more segmentation techniques to classify each 3D point of the 3D point cloud as a structural feature of the physical structure. The computer system can select the group of 3D points that corresponds to the portion of the 2D image targeted to be replaced or supplemented with the synthetic image data. The selected group of 3D points represents the 3D surface orientation of the identified portion of the 2D image. In some examples, the synthetic image data can include one or more image swatches. The image swatches can be layered over the 3D surface associated with the selected group of 3D points. The image swatches can then be warped to fill the 3D surface with the synthetic image data.

The computer system can also detect a scene effect from the original 2D image depicting the physical structure. For example, a scene effect can be represented by a specific configuration of color components in an image, such as hue, value or saturation, and/or a specific configuration of color characteristics, such as color cast, light source location, depicted weather conditions, and so on. The detected scene effect can be applied to the 2D image augmented by the synthetic image data to generate the photorealistic image.

In some implementations, the computer system can detect a specific scene effect associated with the original 2D image (without the synthetic image data). For example, the computer system can execute one or more light source estimation techniques to detect or estimate a location of a light source in the 2D image. Non-limiting examples of light source estimation techniques can include using Lambertian or specular spheres, a local analysis of surface and image derivatives to estimate light direction, detecting visual cues of light sources based on object or texture occlusion, detecting light sources given a set of known surface normals and corresponding luminance values, and other suitable techniques. The computer system can also estimate the position of the sun using the light source estimation techniques described above. Additionally, the computer system can detect weather conditions depicted in the 2D image using image analysis techniques. In some implementations, to detect the scene effect of the original 2D image, the computer system can also detect other characteristics of the 2D image, such as a color cast, film or noise grain, chromatic aberrations, lens or other effects applied by the image capturing device, or other suitable characteristics. One or more ray tracing techniques can be applied to the detected characteristics to generate the scene effect. The computer system can then generate the photorealistic image by rendering the detected scene effect onto the 2D image and the synthetic image data.

While a 3D representation of a home may include spatially accurate renderings from any virtual camera position, without some data from the original 2D image, there may be some contextual information that is lost due to the differences between the render space of the graphical processing unit (GPU) and the camera space of the image capturing device. For example, metadata representing camera intrinsics (e.g., calibration or distortion), which capture a physical structure in an image in a certain way may not be present as a parameter of the virtual render space. Thus, visual differences between a 2D image of a physical structure and a 3D reconstruction of that same physical structure may be significant. When these visual differences are acted upon, such as design modifications to the 3D model made in isolation to original camera intrinsics or other scene data that is inherent from the 2D image, the visual differences appear even more stark. As a technical advantage of the present disclosure, certain implementations relate to a computer system that composites a 3D image with a 2D image, such that pixel information of both images are displayed in a common render and display space. For example, a common render space can be achieved by detecting a lighting effect from the camera space and recreating the lighting effect on selected portions of the 3D model (e.g., of a 3D representation of a roof), thereby using the same rendering protocol as the camera.

To illustrate certain implementations described above and only as a non-limiting example, a user may operate an image capturing device (e.g., a smartphone with a camera) to capture a 2D image of his or her house, which has a grey roof. Synthetic image data, which may be generated by third party sources, may be a computer-generated depiction of new red roof shingles provided by a manufacturer. Certain implementations include a computer system configured to generate a photorealistic image of the house, in which the grey roof is replaced by the red roof shingles. The computer system can be configured to generate a 3D model of the roof, supplement the 3D model with the synthetic image data, and generate a photorealistic image of the house with red roof shingles, instead of a grey roof. The computer system can evaluate metadata associated with the image capturing device or the 2D image itself. For example, the metadata may be camera intrinsic metadata, including a lens distortion, color aberration, a timestamp of the 2D image, a camera position (e.g., a geographical location and orientation), a camera lens type, and other calibration data specific to the camera. The computer system can use the camera intrinsic metadata, which was collected from the image capturing device, to generate the photorealistic image of the house with the new red roof shingles. The photorealistic image recreates a scene effect detected from the original 2D image of the house.

Figure 1B:

FIG. 1A is a representative 2D image of a house, and FIG. 1B depicts a similar perspective view of a reconstructed digital 3D model of that same house. An input image, such as the one in FIG. 1A may be referred to as "source input," or in certain embodiments as described herein may be used as a "backplate." The 3D model may be created using techniques as described in U.S. Pat. No. 9,437,033 and U.S.

patent application Ser. No. 15/411,226, both commonly owned by the assignee of the present disclosure, and the contents of which are herein incorporated by reference in their entirety for all purposes. The 3D model replicates in a digital medium the 3D geometry and textures of the original house; this digital presentation enables select geometries or features to be digitally modified. For example, a proposed window or roof material may be digitally implemented on the 3D model to depict a design change by simply replacing the digital information comprising the original feature with the digital information (e.g., the synthetic image data) of the proposed feature.

Figure 2A:
FIGS. 2A-2B illustrate compositing a 3D model feature onto a 2D captured image, according to some aspects of the present disclosure.
Figure 2B:

FIG. 2A illustrates the same 3D model of FIG. 1B, however, the pixels representing the roof of the house have been modified with synthetic image data (e.g., comprising red shingles). In some implementations of the present disclosure described herein, that same red roof can be presented in the original 2D image as a photorealistic composite image of the selected portions of the 3D model and the 2D image, such that the input image appears to have the proposed red roof material instead of its original roof. FIG. 2B illustrates this photorealistic composite image.

As can be seen from FIG. 2B, compositing the select 3D model data with the 2D image imparts additional scene information giving a more robust and lifelike appearance to the proposed material. Such compositing subjects the 3D model selections to, among other things, the original camera intrinsics and lighting effects, such as shadows, consistent with the original image as well as broader aesthetic appreciation for how the proposed material appears relative to the rest of the scene and not just the digital 3D model. This may generate additional design considerations for a user choosing additional or alternative proposals. For example, while the red roof of FIG. 2A may be appealing against the reconstructed geometry made from distortion and color aberration free data, when reapplied to the original image with the same camera conditions it has a different aesthetic.

In some embodiments, images across a series of frames, for example video feeds or stream of images otherwise, is composited with the 3D model. 3D model geometry is selectively applied to the subject of the image stream, with applicable effect impart such as motion blur for video input and user interface tools enabled to enhance interaction.

Figure 3:
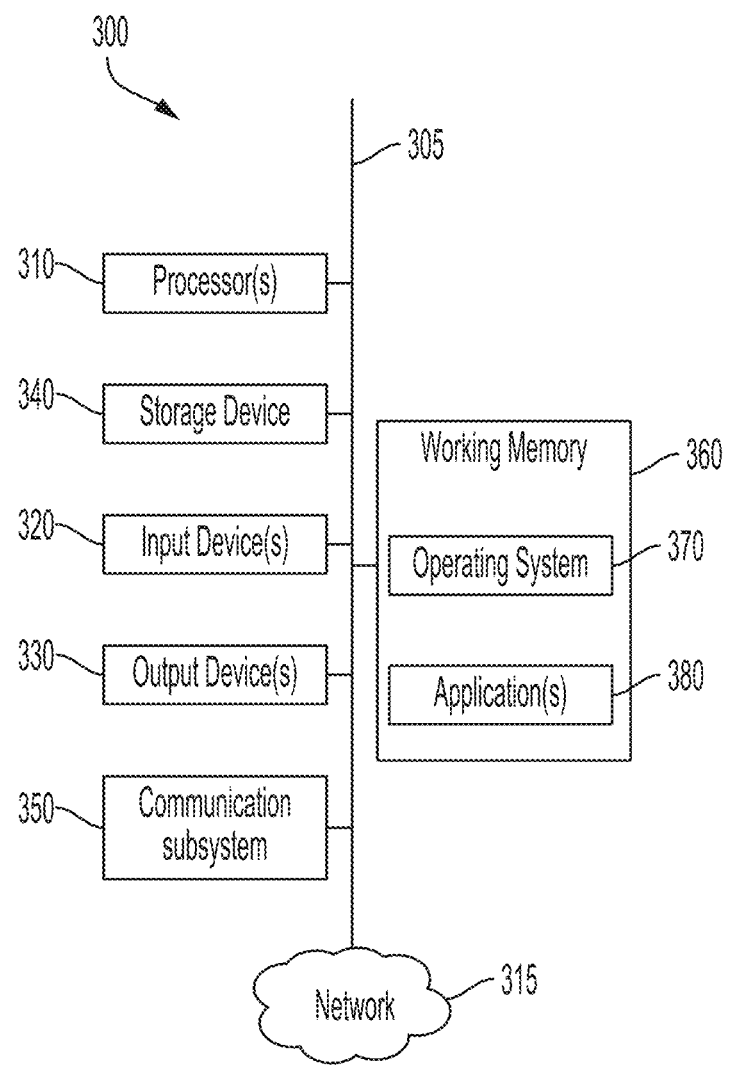
FIG. 3 illustrates a diagrammatic representation of a machine in the example form of a computer system in accordance with some aspects of the present disclosure.

Referring now to FIG. 3, a simplified computer system 300 configured to perform some or all of the steps of the methods described herein is illustrated. FIG. 3 is intended to provide a generalized schematic of various components which may be utilized as appropriate. FIG. 3, therefore, broadly depicts how individual system elements may be implemented separately or integrated with other elements.

System 300 is shown comprising elements that may be coupled directly such as by bus 305, or communicatively coupled such as by network connection 315, as appropriate. Hardware elements may include one or more processors 310, including without limitation one or more general purpose processors, or special purpose processors such as graphics accelerators or graphics processing unit (GPU) otherwise. Hardware elements may also comprise input devices 320, which can include user input means such as a keyboard, a mouse, or camera. Hardware output devices 330 may include display devices, audio output, or the like.

System 300 may further comprise, or be in communication with one or more non-transitory storage devices 340, which can include, without limitation, local and/or network accessible storage, such as disk arrays, disk drives, optical storage devices, solid state storage, random access memory (RAM), and/or read only memory (ROM), any of which can be programmable or updated as appropriate.

System 300 may comprise communication subsystem 350, which can include a modem, network ports (wired and wireless), nearfield devices, cellular communications, WiFi connections, and the like. Communications subsystem 350 may include one or more input and/or output communication interfaces to permit data to be exchanged with a network such as the network described below to name one example, other computer systems, television and/or any other devices described herein.

Depending on desired functionality or other implementation concerns, a portable electronic device, such as a first electronic device, may be implemented as an input device 320.

In some embodiments, system 300 will further comprise working memory 360, which may be implemented as RAM or ROM as described above.

System 300 further comprises one or more software elements and modules through working memory 360, depicted in FIG. 3 as at least operating system 370 and device drivers, executable libraries, or other code implemented as one or more applications 380, which may comprise computer programs provided by various embodiments, or designed to implement methods or configure systems present in various embodiments as described herein. Merely by way of example, one or more procedures described with respect to the methods discussed above might be implemented as code or executable instructions by a computer and/or processor within a computer.

In some implementations, the one or more applications 380 can be configured to generate a 3D model representing a physical structure (or a portion thereof) depicted in a 2D image. In some implementations, the 3D model can be generated from a single 2D image. In other implementations, the 3D model can be reconstructed from multiple 2D images, such that two or more of the multiple 2D images share features of the same physical structure (e.g., images of the same house, but at different angles). In some implementations, the one or more applications 380 can be configured to execute machine-learning models to generate a predicted 3D model that represents the physical structure (or a substructure of the physical structure, such as the roof only). For example, the one or more applications 380 can include a machine-learning pipeline, which initially performs machine-learning-based image segmentation on the pixels of a 2D image, and then subsequently performs machine-learning-based depth estimation. Non-limiting examples of techniques for image segmentation include Fully Convolutional Networks, U-Net, Seg-Net, or any other suitable techniques. A non-limiting example of a depth estimation technique may include a technique for estimating gradient information of an image. The image segmentations techniques and the depth estimation techniques can also be integrated into a common network, such as with Pixel-Level Encoding and Depth Layering (PLEDL). In some implementations, the one or more applications 380 can execute line extraction techniques to generate the 3D model (e.g., in the case of generating a wire frame of the house depicted in the 2D image).

A set of these instructions and/or code may be stored on a non-transitory computer readable storage medium such as the storage device 340 described above. In some cases, the storage medium might be incorporated with a computer system, such as system 300. In some embodiments, the storage medium might be separate from a computer system e.g., a removable medium, and implemented to program, configure, or adapt a general purpose system with additional instructions.

Variations to system 300 and the description above may be made in accordance with specific requirements, such as distributed computer to process information via a processor 310 at one node and display that information on a display device via output device 330 at a second node. As mentioned above, in some embodiments system 300 is utilized to perform methods in accordance with various embodiments of the described technology. According to a set of embodiments, some or all of the procedures of such methods are performed by system 300 in response to processor 310 executing one or more sequence of one or more instructions, which might by incorporated into operating system 370 or other code such as applications 380. Merely by way of example, execution of the sequences of instructions contained in the working memory 360 might cause processor 310 to perform one or more procedures described herein.

The technology as described herein may have also been described, at least in part, in terms of one or more embodiments, none of which is deemed exclusive to the other. Various configurations may omit, substitute, or add various procedures or components as appropriate. For instance, in alternative configurations, the methods may be performed in an order different from that described, or combined with other steps, or omitted altogether. This disclosure is further non-limiting and the examples and embodiments described herein do not limit the scope of the invention.

It is further understood that modifications and changes to the disclosures herein are suggested to persons skilled in the art, and are included within the scope of this description and the appended claims.

Figure 4:
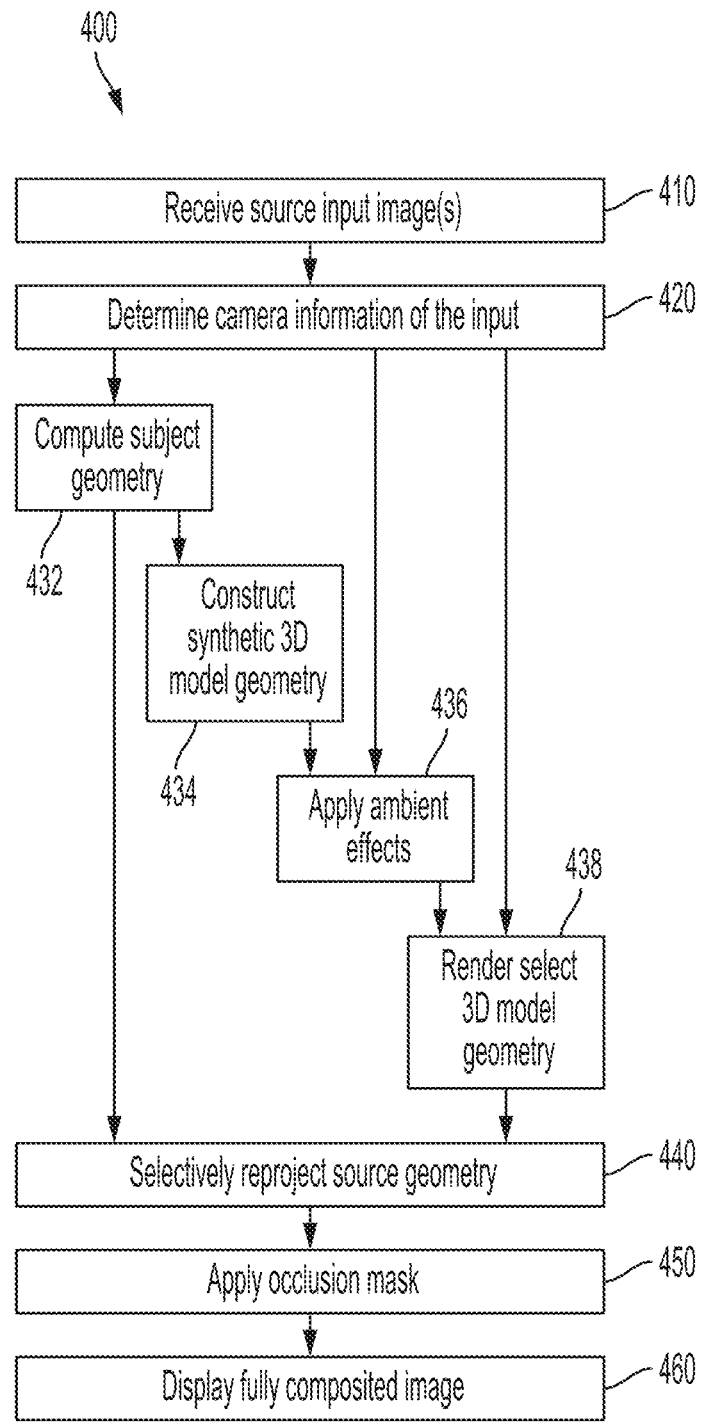
FIG. 4 illustrates a process for creating a photorealistic (e.g., composite) image, according to some aspects of the present disclosure.

FIG. 4 illustrates process 400 for generating photorealistic (e.g., composite) images, which recreate a scene effect detected in the original 2D image. Process 400 can be performed at least in part by computer system 300. Further, process 400 can be performed to detect a scene effect from an original 2D image of a physical structure, and to augment the original 2D image using synthetic image data by applying the detected scene effect to the synthetic image data in a photorealistic manner.

At step 410, computer system 300 can receive a source input. The source input can include image data corresponding to a subject and may be captured by an imaging capturing device, such as a ground capture platform like a smart phone or aerial capture device, such as satellite imagery; other source data may include spatial information such as LiDAR or texel cameras. Source input may be received at a storage device or other interface tool, as described more fully with reference to FIG. 3 above.

At step 420, metadata (e.g., camera information) pertaining to the input images received at step 410 is calculated. In some implementations, the metadata may be provided as a cv.json report, such as from a smartphone camera operating system or the imaging device otherwise, and comprise camera intrinsics, such as lens distortion, color aberration and other calibration data specific to the camera. The metadata may also include a camera position (e.g., location and orientation) for each respective image, or changes in camera position between the input images. For example, if a first input image is received with a camera position of (x, y, z), a second camera position may be the first camera position multiplied by a rotation and/or translation matrix to give a second position relative to the first camera position. Such camera positional information may also be provided as a cv.json report. In some embodiments, the metadata further includes ambient data, such as illumination data, about the input images.

In some embodiments, the metadata can be derived from the images rather than provided by the imaging capturing device (e.g., a digital camera, a mobile device with a digital camera, a camera mounted on a drone, a satellite image, and other suitable image capturing devices). For example, camera position may be estimated by extracting geometrical features of a physical structure depicted in the input image (s) and matching those geometrical features as extracted from other input images, and triangulate camera positions relative to those features using techniques such as simultaneous localization and mapping (SLAM) or visual inertial odometry.

At step 432 the computer system can compute the 3D geometry of the physical structure. In some implementations, this comprises defining and scaling the lines and planes of the captured physical structure without the intrinsics of the capture platform or lighting effects the physical structure was in at time of capture. In other words, to accurately create a "true" model of a physical structure, the subjective capture variables must be controlled for. A camera's subjective lens distortions and calibrations are not present in an absolute sense, and are not possessed by the physical structure(s) depicted in the image, and should be controlled for in determining the 3D geometry of any subject captured by that camera. In some implementations, the computer system can generate the 3D geometry using a minimum amount of 3D geometric data (e.g., minimum amount of 3D points or polygon meshes) needed to reconstruct or otherwise virtually represent the physical structure depicted in the source input image. As a non-limiting example, the computer system 300 can generate the minimum amount of 3D geometric data using a trained machine-learning model (e.g., a pipeline of image segmentation and depth estimation machine-learning models). As another non-limiting example, the computer system 300 can extract structural lines from the 2D image to generate a virtual wire frame representing the physical structure and classifying closed boundaries as structural features of the physical structure. As yet another non-limiting example, the computer system 300 can define 3D surface boundaries using depth information associated with the 2D image depicting the physical structure (e.g., in situations with a LiDAR camera is used to generate a 3D point cloud representing the physical structure).

At step 434, the computer system 300 generates a 3D model of synthetic geometry representing the physical structure. The synthetic 3D geometry correlates and rectifies the computed geometries of step 432, such as by aligning planar facades, connecting vertices or line fragments to form lines (for example, forming a roofline and connecting the roofline to a line representing a rake of a roof), in a render space. The render space is a graphic processing coordinate construct. In some implementations, the synthetic 3D model is further textured with identified materials or phototextured with the input images themselves. In many commercial products, the resultant synthetic 3D model at step 434 is the end of the image pipeline (see, e.g., FIG. 1B).

At step 436, the computer system 300 can select portions of the synthetic 3D model for compositing with the input image. For example, the computer system 300 can select a roof portion of the synthetic 3D model (e.g., based on a user input indicating that he or she seeks to preview new roof shingles). Having determined the camera position from step 420, the selected portion may be digitally rendered from a perspective of the same view of any of the input images. The ambient light effect, such as stored in the cv.json report for that camera position, may be similarly applied to the synthetic 3D model selection to impart the same conditions as in the original input image. In some embodiments, device information such as geolocation or time of capture may provide ambient light information. For example, for a given GPS location at a given time of day, sunlight information such as direction and brightness may be derived and applied to the synthetic 3D geometry. Additionally, in some implementations, characteristics of the input source image, such as a color cast, chromatic aberration, noise grain, and other suitable characteristics can be detected and applied to the synthetic 3D model selection.

At step 438 the rendered select 3D geometry is further processed to account for or reapply the camera intrinsics for the input image capture device. The select 3D portion may, then, be said to display in camera space (as opposed to the graphics render space where the 3D model was constructed).

At step 440 the original input image for the respective camera pose is reprojected with the synthetic 3D selection. Reprojection of the original image is itself selective to avoid the input image overlapping and occluding the synthetic 3D model portions that are intended to be displayed. To control reprojection, the computed geometry from step 432 serves as a backplate image to the synthetic portions, and a z-buffer brings forward those portions of the backplate that have a nearer z-distance to the camera information as determined at 420.

The resultant render is a composite synthetic image with the original input, as illustrated by FIG. 2B. As can be seen in FIG. 2B, the American flag (which was not part of the subject reconstructed geometry) is occluded by the synthetic 3D roof material at those pixel locations. To correct for any occluding effects, an occlusion mask is calculated at step 450. Occlusion mask calculations is described in further detail with reference to FIG. 4.

It will be appreciated, that steps 438 and 440 may be inversed for the respective image data. For example, instead of applying the camera intrinsics to the synthetic geometry of the 3D model, the synthetic geometry is maintained and the input source image is warped to remove the camera intrinsics and reprojected in graphics render space instead.

Finally, at step 460, the fully composited image is displayed upon a display device as the photorealistic image.

Figure 5:
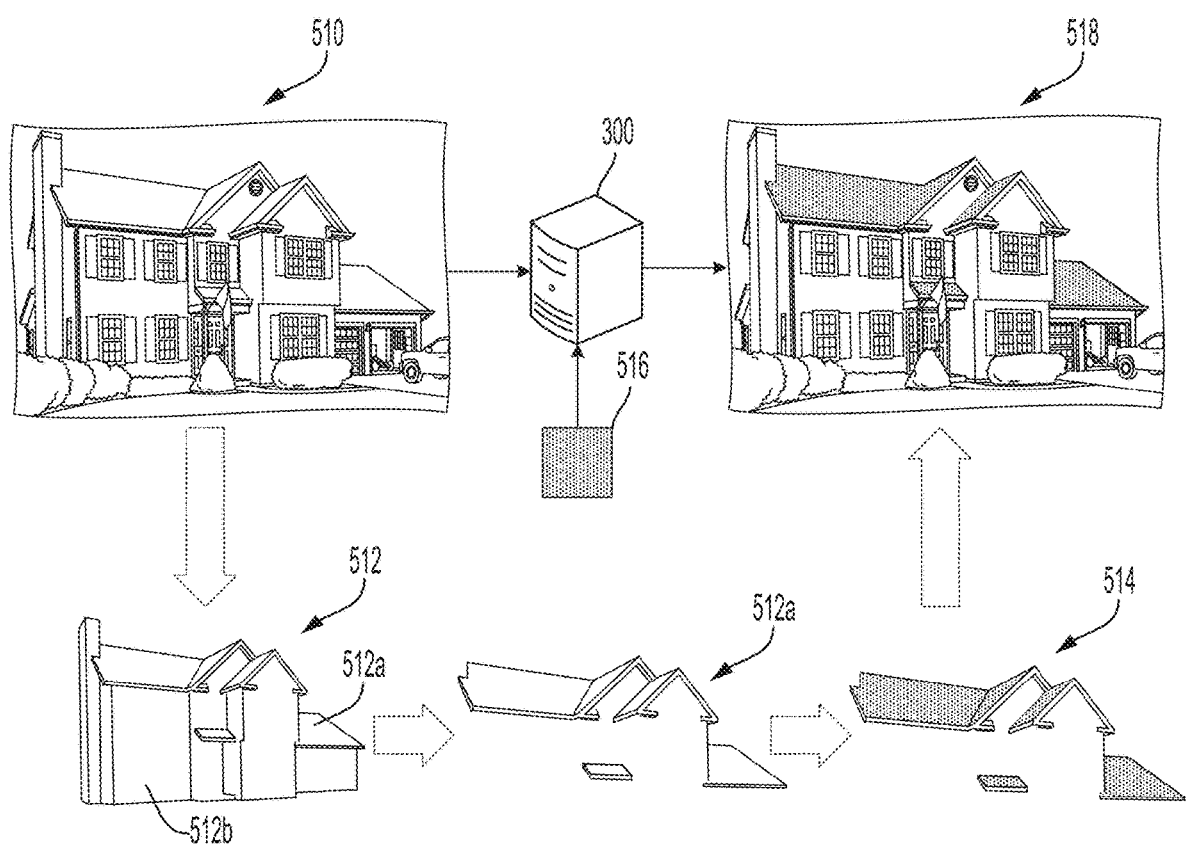
FIG. 5 illustrates an example of a process for generating a photorealistic image of a physical structure using synthetic image data depicting a new roof, according to some aspects of the present disclosure.

FIG. 5 illustrates an example of a process flow for generating a photorealistic image of a physical structure, according to some aspects of the present disclosure. Input image 510 may be a 2D image depicting a house. For example, input image 510 is an image captured by an image capturing device of a mobile device, such as a smartphone. Computer system 300 may receive input image 510 as an input. Further, computer system 300 can be configured to generate photorealistic image 518, which depicts the house of input image 510, however, the pixels depicting the roof of the house are replaced by synthetic image data 516. For example, synthetic image data 516 may include a computer-generated design that depicts new roof shingles. The photorealistic image 518 may be generated to provide a preview of how the new roof shingles would look if installed onto the house depicted in input image 510.

In some implementations, computer system 300 may also receive an indication of a portion of the input image 510 to replace with the synthetic image data 516. In some implementations, a user operating a native application on a mobile device can use the native application to select or otherwise identify that the roof of input image 510 is to be replaced with synthetic image data 516. It will be appreciated that the present disclosure is not limited thereto, and thus, any portion of input image 510 can be selected for replacement with synthetic image data 516 using any suitable process.

After receiving input image 510, computer system 300 can generate a 3D model 512 from input image 510. In some implementations, the 3D model 512 may represent a minimum amount of 3D geometric data needed to virtually represent the house depicted in input image 510 for the purpose of generating the photorealistic image 518. In some implementations, 3D model 512 can be generated using one or more machine-learning techniques. For example, computer system 300 can execute one or more semantic segmentation techniques and one or more depth estimation techniques to generate 3D model 512 from input image 510. Further, the one or more semantic segmentation techniques can be executed to classify portions of 3D model 512. For example, computer system 300 can execute one or more semantic segmentation techniques (on 2D pixels or on 3D points) to detect roof surface 512a and façade surface 512b.

In some implementations, computer system 300 can perform one or more line extraction techniques to generate a wire frame of the house depicted in input image 510. The 3D model 512 may be the wire frame generated by computer system 300. One or more semantic segmentations techniques can be executed to classify lines as roof surface 512a and façade 512b. Computer system 300 can then extract roof surface 512a from 3D model 512, given that the roof surface 512a matches the roof depicted in input image 510, which was previously identified by the user as being the target pixels to be replaced with synthetic image data 516. In some implementations, computer system 300 can predict a 3D planar surface representing the closed boundary associated with the roof 512a. Computer system 300 can compute a pitch of the 3D planar surface directly from the depicted roof surface 512a, and then perform a boundary-fill function to fill the closed boundary associated with roof surface 512a with synthetic image data 516 that is warped according to the computed pitch of the 3D planar surface of the roof surface 512a to generate the modified roof 514. Warping may include transformation, rotation, or scaling operations to fit the synthetic image data to the planar surface. The modified roof 514 can then be reprojected onto the input image 510 to generate photorealistic image 518. The photorealistic image 518 can then be further processed to apply an original scene effect of input image 510 (potentially determined using the camera intrinsics of the metadata associated with the 2D image or the image capturing device).

Figure 6:
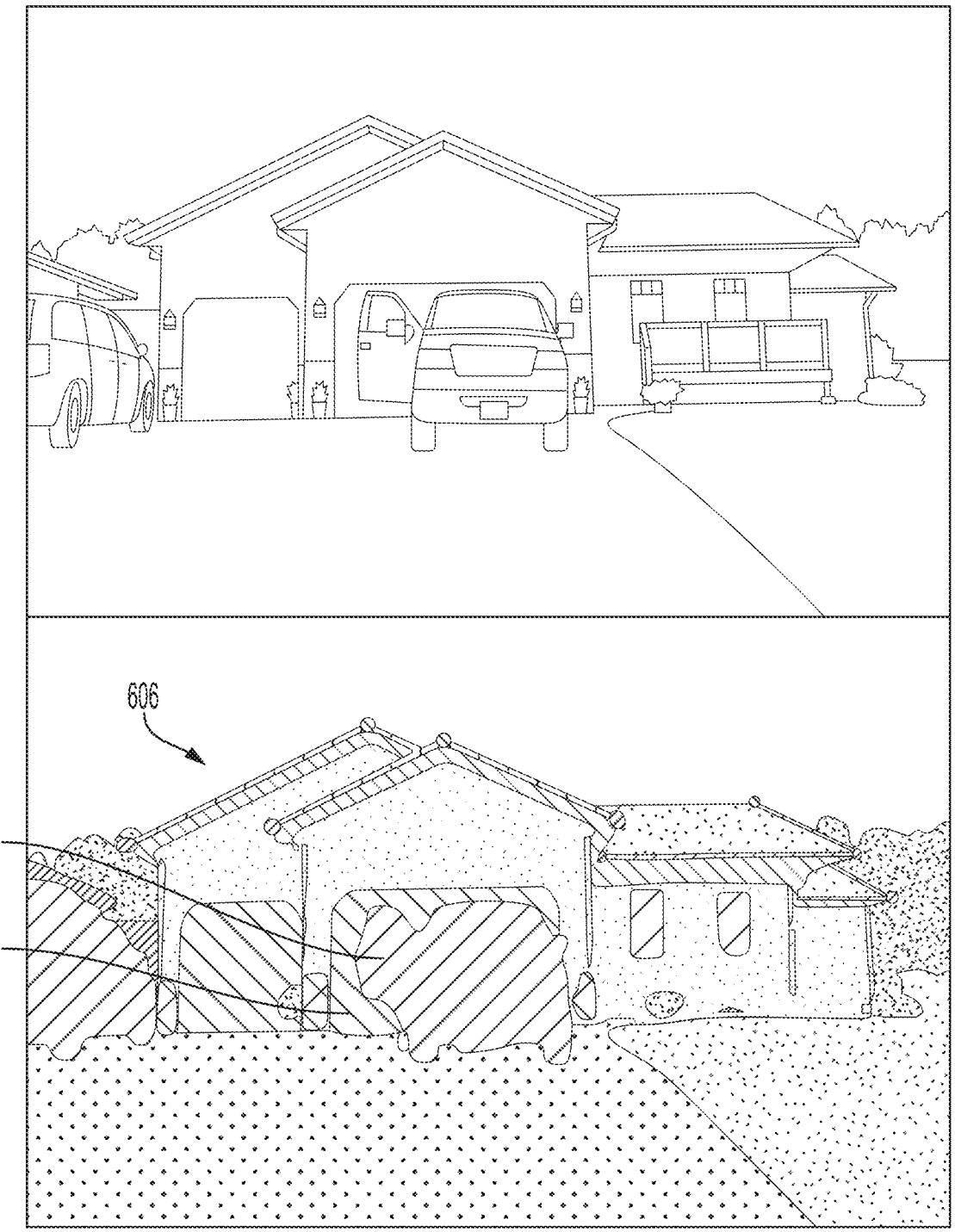
FIG. 6 illustrates a segmented image for occluding object detection, according to some aspects of the present disclosure.

FIG. 6 illustrates an exemplary occlusion mask using a model trained on the Cityscapes dataset. FIG. 6 illustrates segmentation of the entire scene, but can be used to understand the presence of occluding objects. For example, garage door 602 is occluded by truck 604; truck 604 is not part of the geometry of building 606, therefore z-buffer calculations at those pixel locations within truck 604 will not be appropriately arbitrated during backplate reprojection (such as in step 440 of FIG. 4) to display the correct pixel nearest the camera, as the scene at that pixel is not based solely on geometry of building 606.

In some embodiments, an occlusion mask, such as a scene understanding mask as in FIG. 6, is applied to the composite image produced at step 440 to identify additional occluding items in the scene. In some implementations, those portions of the occluding objects are not reprojected forward as a backplate reprojection, but the pixels of the synthetic 3D model portions at the location of the occluding object are removed from the composite image to provide the effect of appropriate occlusion by non-subject geometry items. Non-limiting examples in the existing art will estimate an occluded area in an image according to an occluded object, and then slightly enlarge the estimated occluded are to a new occluding object geometry. The goal of such techniques in the art is to ensure consistent pixel boundaries between occluded geometry and the occluding geometry and to ensure the occluding geometry occludes all portions of an occluded subject by overcorrecting the size of the occluded subject. By contrast, in step 440 the complete occluded geometry is known, and no estimations are needed to apply to the occluding object to ensure proper boundaries. In some embodiments of the present disclosure, as semantic labeling does not always produce clean edges in its identification, an estimated occluding area is calculated and then diminished, and pixels of the occluded synthetic 3D model are removed within the diminished area. The overall effect will be to favor displaying pixels of the occluded synthetic 3D model portion of the composite at the expense of displaying the occluding object at the boundaries between the occluding object and the synthetic 3D model. As the intent of the compositing is to display the 3D model portion, the diminished occluding geometry preserves the intended appearance better than the approaches in the art.

Figure 7:
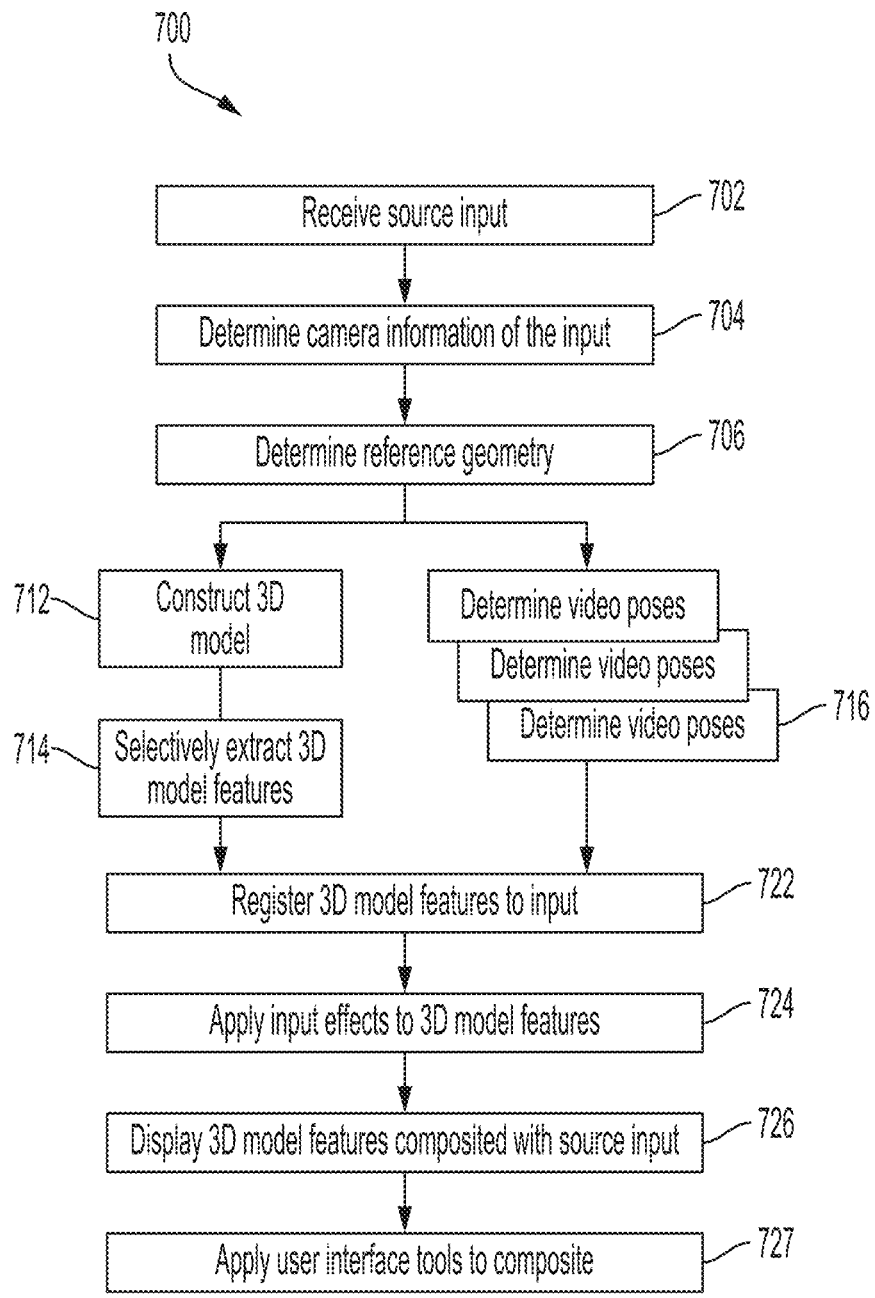
FIG. 7 illustrates a process for creating an interactive composite image stream, according to some aspects of the present disclosure.

FIG. 7 illustrates method 700 for creating a composite image stream across a number of frames, as opposed to the single frame as described above. Method 700 begins similar to process 400 by starting, at 702, with receiving source input. Source input at 702 is a series of images a single subject across time and will be referred to herein as a "video" though other temporally related images stream are contemplated.

At step 704 select frames are extracted from the video input and camera information such as pose and intrinsics are determined from the extracted frames.

At step 706 a reference geometry of the subject (e.g., the minimum geometry of a physical structure) is determined from the frames selected at step 704. The reference geometry is a series of recreated geometrical constraints, preferably the minimum number of constraints, that satisfy the camera information of 704. For example, if a line appears in an image of 704, for a reference geometry to satisfy that image it would include that line as well. In some embodiments capturing a house, the reference geometry is a recreated model of the house's roof. In some embodiments, the reference geometry is the footprint of a house (an outline of the house as viewed from above).

Steps 712 follows similar methodologies as in process 400, step 434 discussed above, wherein additional geometric constraints of the images are used from the image inputs to reconstruct a full synthetic 3D model of the subject.

In some embodiments, a series of camera poses for each frame of the video is determined, for example using image processing like match moving, to determine the position of the camera relative to the subject and appropriate scale.

In some embodiments, select features are selected at 714 from the synthetic 3D model (for example, a window or door of a house) and are applied at 722 to the input images according to the determined poses from 716. In other words, if a camera pose views a feature in the input image a certain way, that synthetic 3D model selection is applied so the geometry of the selection is matched to that of the feature according to the camera pose. In some embodiments, the entire synthetic 3D model is applied to the input image. It should be noted that at 722, the application or registration of the synthetic 3D model aspects does not mean those portions are displayed.

At 724, effects incident to the image input are applied to the synthetic 3D model geometry. For example, changes from one frame to another of a video induces motion blur to the images across frames; at 724 motion blur and other visual effects and artifacts are similarly applied to the synthetic 3D model geometry.

At 726 the synthetic 3D model features are selectively displayed with the video of the image source input. For example, as the video advances, a view may select a subregion of a house (such as by clicking a pixel within such subregion, like a roof) in the video, this selection will prompt the synthetic 3D model roof portions corresponding to that geometry to display over the original image input roof. In some embodiments, design options similarly display with the synthetic 3D model display such as changing the material of that geometry. As the video advances in frames the roof is displayed according to the selected synthetic 3D model material.

In some embodiments, user interface tools and receivers are updated for the source input at 727. For example, pixels boundaries representing certain features are artificially expanded in response to the source input metrics. As frame rates increase or decrease, the pixel boundaries for certain features may increase or decrease to make it easier for a user to select a feature in a video that is moving quickly. In some embodiments, relative pixel motion within a display frustum determines pixel boundaries, such that even if a video has a slow frame rate if a feature substantially moves one frame to another an interface pixel boundary similarly increases in size to permit easy selection of that moving feature by a user.

Figure 8:
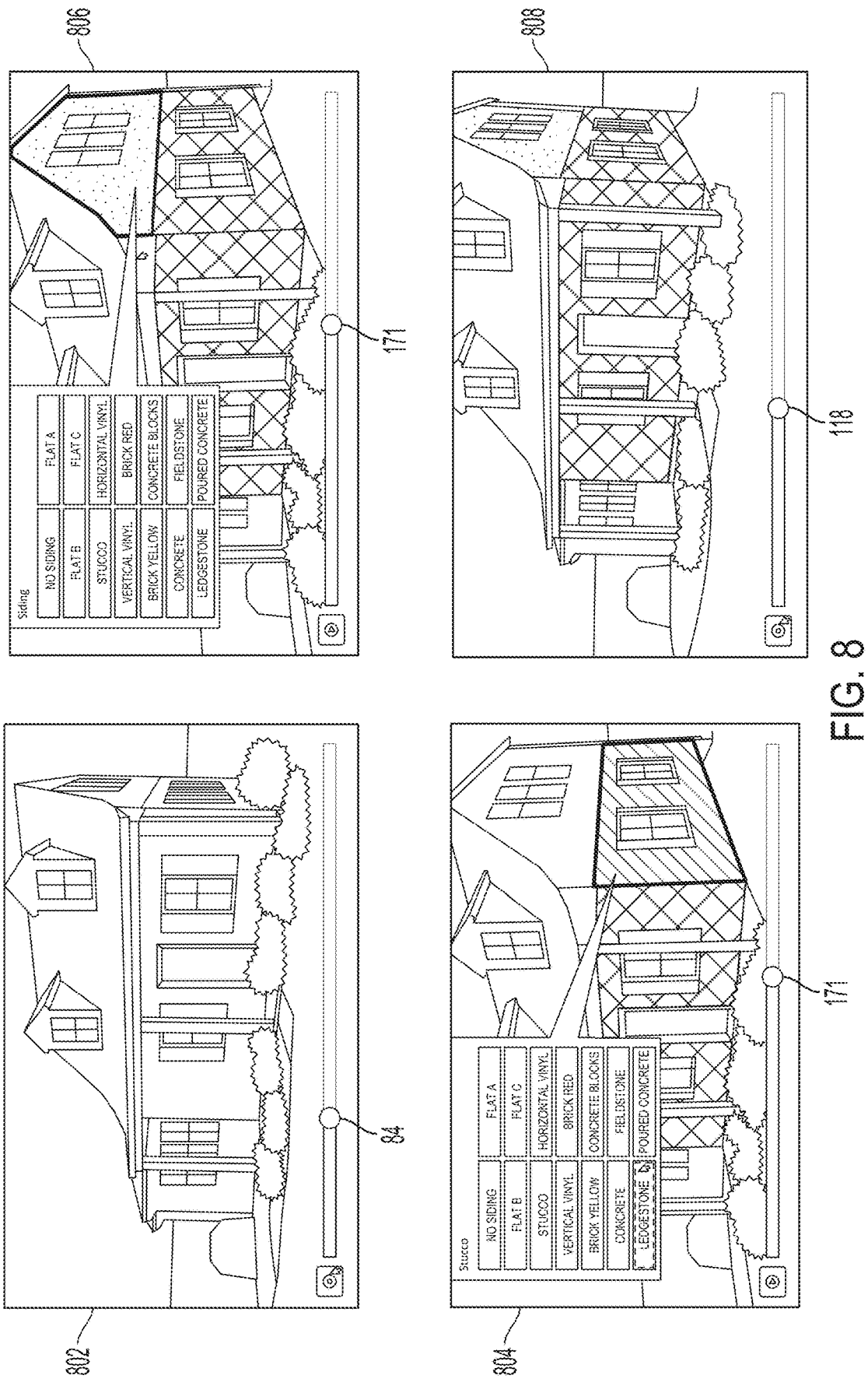
FIG. 8 illustrates interactions with a composite image stream at select data frames, according to some aspects of the present disclosure.

FIG. 8 illustrates a sample display of method 600. Image 802 illustrates a video frame within a series of frames. Image 802 depicts frame 84 of the video, at image 804, illustrating frame 171 the lower half of the right facade of the home is selected, which activates the synthetic 3D model geometry registered to that facade. A design option box appears permitting the user to change the digital information comprising the synthetic 3D model at that portion.

At image 806, depicting video frame 171 still, it can be seen that the user has updated the synthetic 3D geometry at that portion for a new material and that material displays on the video. The user continues to make selections to the geometry for the upper portion of that same facade.

At image 808, instead of advancing the video, the user returns to an earlier frame in the video (frame 118). While the video images return to the camera pose for that image frame, and can be said to respond according to the input timeline, the selections made at frame 171 persist in the display even though those changes had not been made when frame 118 was first displayed. In this sense, in addition to compositing multiple display data streams (the 2D input and 3D synthetic), multiple timelines are currently displayed. The first timeline is responsive to the camera pose, or capture, input sequence; as described above, displaying information at video frame 171 presents the scene based on the physical cameras position in gathering the input information. The second timeline is responsive to interactions with synthetic 3D model display options; this timeline displays cumulative actions with the synthetic 3D model data, i.e. is subject-dependent, and is not frame-sequence dependent like the first timeline for camera pose(s).

Additionally, techniques are described herein for determining a surface normal of a 3D planar surface associated with a closed boundary, such as a roof facet of a house, depicted in a 2D image. For instance, computer system 300 can execute the techniques disclosed herein to automatically determine the surface normal of the depicted closed boundary directly from the 2D image without interface tools or visual overlays. As used herein, the term "physical structure" refers to any 3D object, man-made or natural. Physical structures may include, for example, houses, offices, warehouses, factories, skyscrapers, and other buildings; arenas, stadiums, monuments, storage tanks, and other non-building constructs; fences, walls, bridges, roads, and other infrastructure; etc.

Figure 9A:
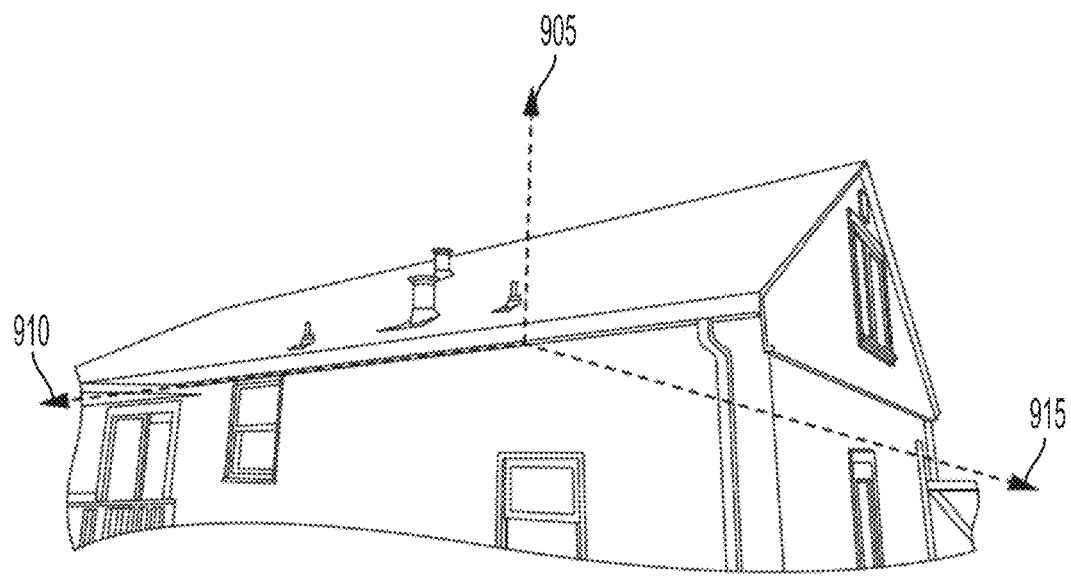
FIGS. 9A-9B illustrate and example of a technique for identifying a vanishing point coordinate system for a physical structure and isolating segmented lines from a 2D image, according to some aspects of the present disclosure.
Figure 9B:
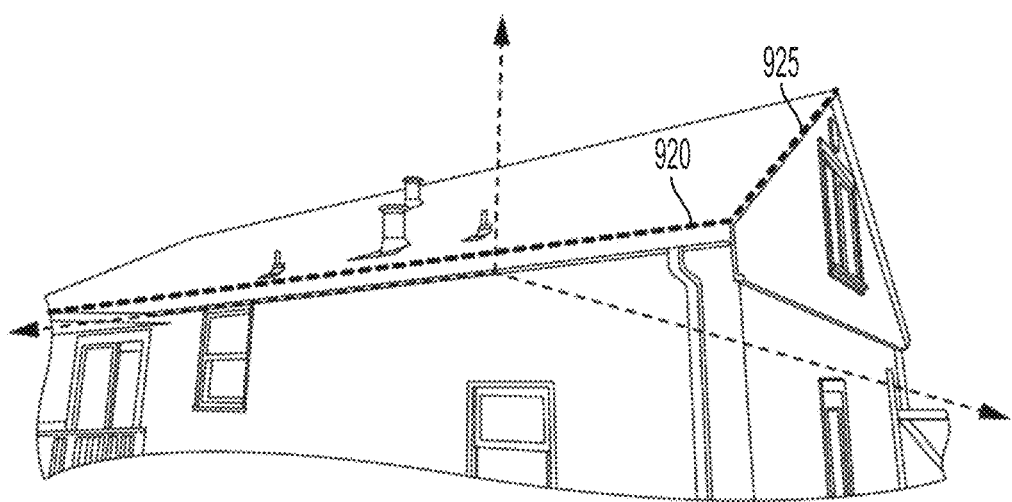

FIGS. 9A-9B illustrate and example of a technique for identifying a vanishing point coordinate system associated with a physical structure and isolating segmented lines from a 2D image, according to some aspects of the present disclosure. FIG. 9A illustrates an image of a side portion of a house. Computer system 300 can evaluate the pixels of the image in FIG. 9A to generate a vanishing point coordinate system. For example, computer system 300 can receive the image of the side portion of the house in FIG. 9A, extract one or more lines depicted in the image (e.g., using line extraction techniques, such as a Hough transform), and identify vanishing lines associated with the roof depicted in the image using the extracted lines. To illustrate, in the image of FIG. 9A, computer system 300 detects the line representing a roof edge and uses the detected line as establishing axis 910 of the vanishing line coordinate frame. Computer system 300 also detects vertical lines (e.g., based on the vertical edges of the windows) and uses a vertical line to derive axis 905 of the vanishing line coordinate frame. Lastly, computer system 300 may use line(s) of the house on which the rake is disposed to derive axis 915 of the vanishing line coordinate frame. In some implementations, the vanishing line coordinate frame may be determined using techniques for determining vanishing points in an image as described in U.S. Patent Application 62/893,100, filed on Aug. 28, 2019, the disclosure of which is hereby incorporated by reference herein in its entirety for all purposes.

Referring now to FIG. 9B, after determining the vanishing line coordinate frame, computer system 300 can execute a trained machine-learning model to classify extracted or identified lines. For example, computer system 300 can classify the extracted lines as the fascia 920 and the rake 925 of the roof of the house depicted in the image. As shown in FIG. 9B, the dashed lines represent the fascia 920 and the rake 925 lines detected by the computer system 300. As a non-limiting example, the trained machine-learning model can be a convolutional neural network, such as a Mask R-CNN, however, the present disclosure is not limited thereto.

Figure 10A:
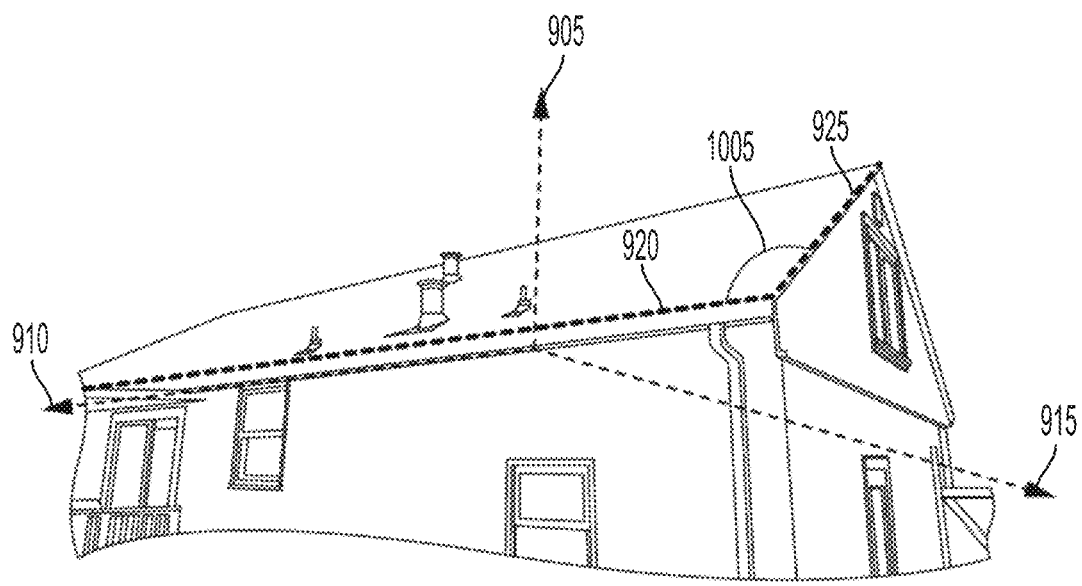
FIGS. 10A-10B illustrate an example of a technique for generating a facet surface normal a closed boundary depicted in a 2D image, according to some aspects of the present disclosure.
Figure 10B:
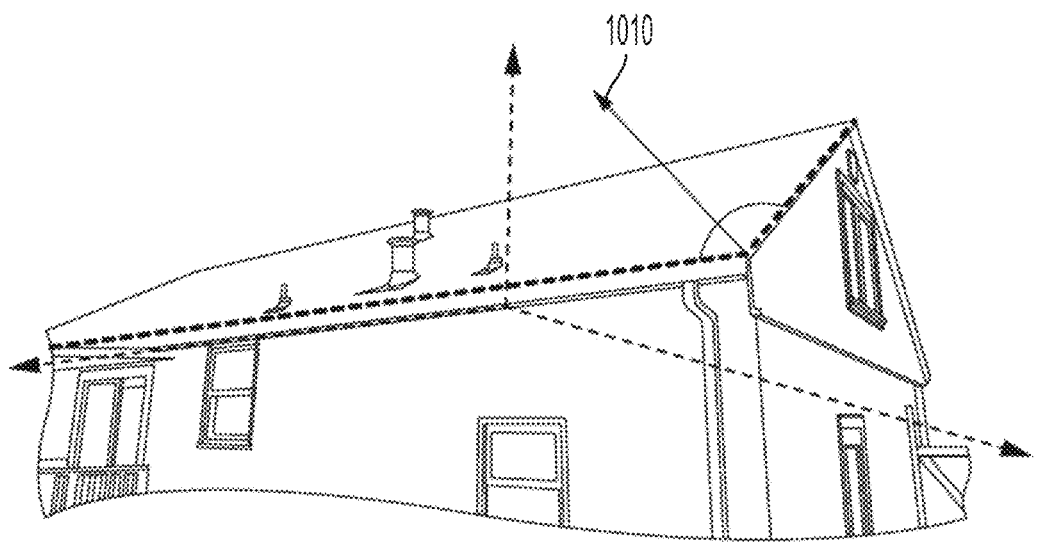

Referring to FIGS. 10A-10B, the trained machine-learning model can be trained to determine that when a rake meets a fascia line at 90 degrees, then a portion of a roof is formed. In some embodiments, computer system 300 can accept as roof geometry grammar that when a rake meets a fascia line, they intersect at 90 degrees. An angular value relative to a vanishing line axis may be computed between an extracted line and a vanishing point axis, such as between right vanishing axis 915 and rake 925 to produce a relative vector for rake 925, or between fascia 920 and left vanishing axis 910 to produce a relative vector for fascia 920. These relative vectors transform the lines orientation in 2D image space to the 3D space of the vanishing point coordinate frame. Computer system 300 can compute a cross product of the line segments' relative vectors comprising the detected rake 925 and the detected fascia 920 to produce orthogonal ray 1010 representing the surface normal of the roof facet comprising fascia 920 and rake 925. Computer system 300 can perform depth analysis to determine which vanishing point is associated with the extracted roof lines. Performing the depth analysis ensures that the surface normal orientation is away from the surface and does not have an anti-commutative orientation pointing into the plane. Fascia and rake lines are used herein as illustrative examples, other grammar orientations for lines intersection at 90 degrees or machine learned 90-degree intersections for roof lines may be utilized. In some implementations, a cross product is computed directly from the line segments' respective orientations in the image, treating their intersection as an origin point.

In some implementations, computer system 300 computes a pitch of the planar surface representing the roof depicted in the image of FIGS. 9A-9B by comparing an angle of the surface normal to the vertical vanishing line of the vanishing line coordinate frame. The result of the comparison represents the predicted pitch of the roof depicted in the 2D image of FIGS. 9A-9B. In some implementations, the pitch of the roof depicted in the 2D image of FIGS. 9A-9B can be predicted by comparing the surface normal associated with the roof to the gravity vector of the image. Thus, using the techniques described herein, the orientation of a 3D planar surface can be predicted or extracted directly from a 2D image based on one or more extracted lines, for example, from a physical structure, such as a house. For example, the predicted orientation (e.g., the pitch) of the 3D planar surface representing the roof of FIG. 9A can be used to warp a digital image swatch before filling the roof pixels with the image swatch, or series of stitched swatches, using the boundary fill function. This way, an original 2D image of a house, for example, can be augmented to replace the roof pixels with the digital image swatch, such that the image swatches are applied to the roof boundary in a photorealistic manner according to the predicted orientation (e.g., pitch) of the 3D planar surface that represents the roof. Though FIGS. 9A-10B depict vanishing points axes and identified lines, these are merely for aid of explaining the techniques and it will be appreciated these calculations do not occur in a visual interface.

Figure 11:
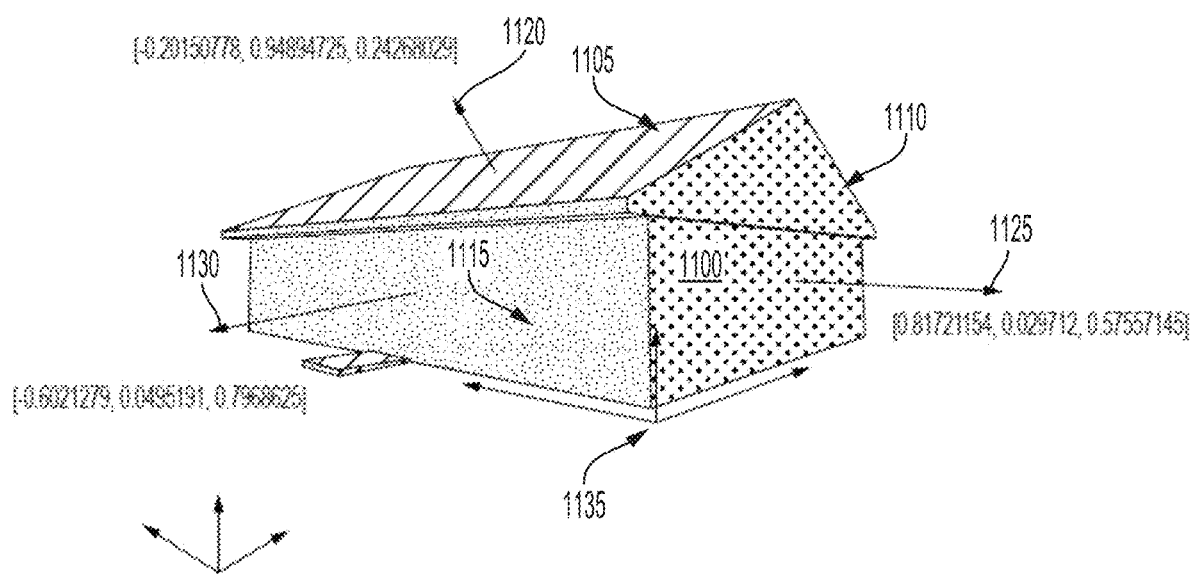
FIG. 11 illustrates an example of a technique for outputting a surface normal based on surface color value prediction, according to some aspects of the present disclosure.

FIG. 11 illustrates an example of a surface normal output based on surface color value prediction, according to some aspects of the present disclosure. For example, FIG. 11 illustrates a surface orientation color map 1100 represented by 3D surfaces in a virtual space. Surface orientation color map 1100 includes surface 1105 (e.g., a roof), surface 1110 (e.g., one side of the house), and surface 1115 (e.g., another side of the house). A 2D image associated with the 3D geometric data representing surface orientation color map 1100 can be inputted into one or more trained machine-learning models, such as a deep neural network including a pipeline of convolutional neural networks, to generate an output as in FIG. 11 expressing a surface normal prediction for each surface (e.g., surfaces 1105 through 1115) as an RGB color space. As a non-limiting example, computer system 300 can generate a prediction of a surface normal for each surface 1105, 1110, and 1115 using techniques, such as those taught by Designing Deep Networks for Surface Normal Estimation available at: https://arxiv.org/pdf/1411.4958.pdf.

Other techniques relate to a trained machine-learning model that generates a surface normal color map, as illustrated in FIG. 11, based on the predicted surface normals determined from a 2D image. The trained machine-learning model can receive a 2D image of an object having one or more planar surfaces (e.g., a house with an angled roof), and generate a prediction of the surface normal as a red, green, blue (RGB) color combination. In some implementations, each color field in the resultant map depicting RGB color combinations per surface may then be translated to corresponding [X,Y,Z] values for 3D space. A vector, for example a unit vector, derived from the translated RGB-to-[X,Y,Z] produces the vector parameters of the predicted surface normal. Referring now to FIG. 11 and according to certain techniques, a surface orientation color map 1100 of a 2D image of the house can be outputted by the trained machine-learning model. In response, a prediction of the surface normal vector (e.g., represented by [X,Y,Z] values) for each surface 1105, 1110, and 1115 can made that treats the R color value of the respective surface as an X value, the G color value as a Y value, and B color value as a Z value. In some implementations, and as illustrated on FIG. 11, the predicted surface normal is expressed as a unit vector based on the RGB values translated to [X,Y,Z] values.

In some implementations, computer system 300 can adjust the associated predicted surface normals of FIG. 11 based on the assumption that the vertical facades (e.g., surfaces 1110 and 1115) should face straight upwards, and therefore, should have surface normals equal to [X,0,Z]. Other geometric assumptions are also possible, such as a flat roof may be assumed to have a 0 value for one of its vectors. Adjusting, or translating, the surface normals of a scene to fit these geometric assumptions gives the predicted surface normal vectors a world centric orientation better suited for objective determination of that surface's position in the real world.

Figure 12:
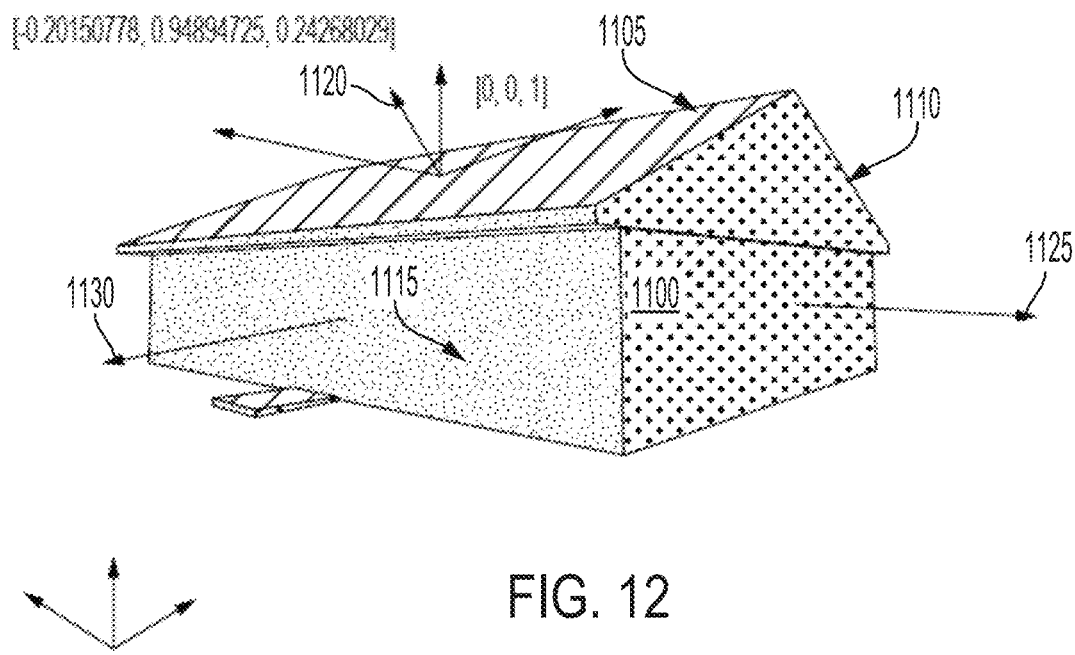
FIG. 12 illustrates an example of a technique for transforming a surface normal to a vertical axis of a coordinate system, according to some aspects of the present disclosure.

In some implementations, as in the example illustrated in FIG. 12, computer system 300 can determine the pitch of a roof facet given the predicted surface normal. For example, computer system 300 can compute the unit vector for the roof facet 1105 surface normal (e.g., the roof facet itself may be identified by segmentation techniques, such as those image segmentation techniques described above). Computer system 300 can then predict the roof facet pitch by computing the angular difference between the unit vector of the roof facet surface normal and the gravity or vertical vector otherwise. The gravity vector or vertical vector otherwise may also have a unit vector of [0,0,1] as depicted in FIG. 12. The angular difference may represent, or inform, the pitch of the surface 1105.

Figure 13:
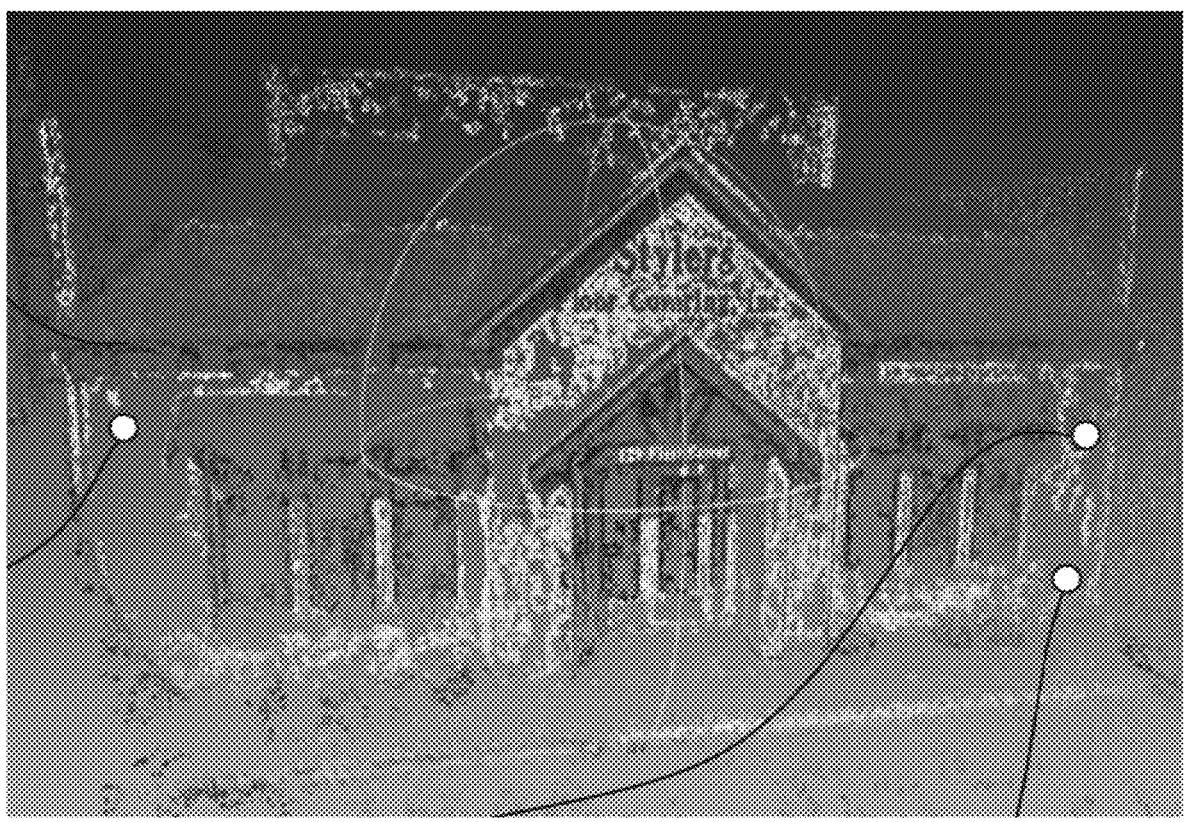
FIG. 13 illustrates an example of a point cloud representing a physical structure generated from an image capturing device, according to some aspects of the present disclosure.

FIG. 13 illustrates an example of a point cloud representing a physical structure generated from an image capturing device, according to some aspects of the present disclosure. A 3D point cloud 1300 of a physical structure, such as a house, can be generated, as illustrated in FIG. 13. In some implementations, the 3D point cloud 1330 can be generated using techniques including structure from motion, dense capture by LiDAR or other time of flight systems or other point cloud techniques (e.g., techniques disclosed in U.S. patent application Ser. No. 14/339,127, filed on Jul. 23, 2014, the disclosure of which is incorporated by reference herein in its entirety for all purposes).

Figure 14:
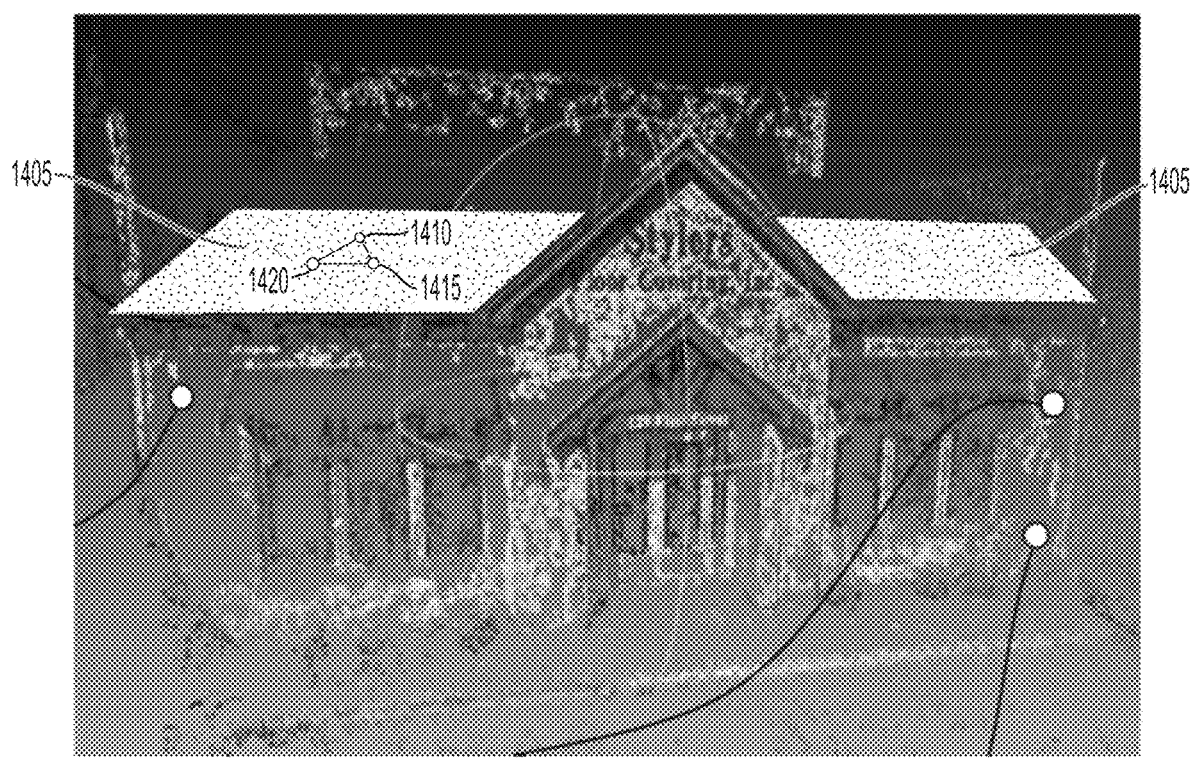
FIG. 14 illustrates an example of a technique for segmenting facets in a 3D point cloud representing a physical structure, according to some aspects of the present disclosure.

Referring to FIG. 14, the 3D point cloud 1300 can be segmented to identify roof facet points in the 3D point cloud. For example, computer system 300 can perform 3D image segmentation techniques to identify roof facets 1405. To identify roof facet 1405, computer system 300 can classify certain 3D points within 3D point cloud 1300 as 3D points representing a roof of the physical structure (e.g., based on an image segmentation followed by a semantic analysis). Computer system 300 can then identify at least three 3D points (e.g., points 1410, 1415, and 1420) within the 3D points classified as the roof. The vectors connecting the three 3D points, respectively, are used to generate a cross product. The cross product of the vectors of the three 3D points results in the surface normal of a 3D plane the three 3D points are disposed upon or within. In this example, the surface normal is associated with the roof facet as the 3D points are points attributed to that planar surface. The surface normal can then ben compared to vertical lines of the point cloud or a gravity vector of the scene to derive a pitch of the roof facet.

As used below, any reference to a series of examples is to be understood as a reference to each of those examples disjunctively (e.g., "Examples 1-4" is to be understood as "Examples 1, 2, 3, or 4").

Example 1 is a computer-implemented method, comprising: receiving a two-dimensional (2D) image and metadata, the 2D image including a set of pixels depicting a physical structure captured by an image capturing device, and the metadata representing one or more characteristics of the image capturing device; identifying a portion of the 2D image to augment with synthetic image data; generating a reference 3D model of the physical structure from the 2D image, the reference 3D model representing the identified portion of the 2D image in a virtual space, and the generation including determining a 3D orientation of a 3D planar surface of the reference 3D model; applying the synthetic image data onto the reference 3D model; and rendering a photorealistic image using the 2D image, the metadata, and the synthetic image data applied to the reference 3D model, the photorealistic image depicting the physical structure augmented by the synthetic image data at the identified portion of the 2D image.

Example 2 is the computer-implemented method of example 1, wherein generating the reference 3D model further comprises: inputting the 2D image into a trained machine-learning model, the trained machine-learning model having been trained to generate the reference 3D model using the 2D image; and generating, based on an output of the trained machine-learning model, the reference 3D model to represent the identified portion of the 2D image in the virtual space, wherein the reference 3D model is an untextured block or planar representation of the physical structure.

Example 3 is the computer-implemented method of examples 1-2, wherein determining the 3D orientation of the 3D planar surface further comprises: segmenting the set of pixels of the 2D image into one or more subsets of pixels, the segmentation being based on an attribute of each pixel of the set of pixels; identifying, from amongst the one or more subsets of pixels, a subset of pixels that corresponds to the identified portion of the 2D image; extracting a plurality of lines from the identified subset of pixels; classifying, using a trained machine-learning model, each of the plurality of lines as a structural feature of the physical structure; determining that an angular difference between two classified lines is a predetermined angle, the two classified lines forming the 3D planar surface; computing a cross product of the two classified lines to generate a surface normal of the 3D planar surface; comparing the surface normal of the 3D planar surface with a vertical vector associated with the 2D image to determine a pitch of the 3D planar surface; warping the synthetic image data according to the pitch of the 3D planar surface; and replacing the subset of pixels that corresponds to the identified portion of the 2D image with the warped synthetic image data.

Example 4 is the computer-implemented method of examples 1-3, wherein generating the reference 3D model further comprises: extracting one or more lines from the set of pixels of the 2D image; building a virtual wire frame in the virtual space using the extracted one or more lines, the virtual wire frame representing one or more edges of the physical structure; identifying a portion of the virtual wire frame that corresponds to the identified portion of the 2D image; and supplementing the portion of the virtual wire frame with the synthetic image data.

Example 5 is the computer-implemented method of examples 1-4, wherein the image capturing device is a Light Detecting and Ranging (LiDAR) depth camera, and wherein generating the 3D model further comprises: generating a 3D point cloud using the LiDAR depth camera; identifying a portion of the 3D point cloud that models the identified portion of the 2D image, the portion of the 3D point cloud being characterized by a surface orientation; identifying three 3D points from amongst the 3D point cloud, each of the three 3D points being associated with a vector; computing a cross product of vectors between the three 3D points, the cross product resulting in a surface normal of the identified portion of the 3D point cloud; determining a 3D surface orientation of the identified portion of the 3D point cloud, the 3D surface orientation being determined using the surface normal; retrieving one or more image swatches; and warping each image swatch of the one or more image swatches according to the surface orientation of the portion of the 3D point cloud.

Example 6 is the computer-implemented method of examples 1-5, wherein rendering the photorealistic image further comprises: determining a scene effect associated with the 2D image by detecting at least one of the following from the 2D image or the metadata: a color cast from the 2D image; a film grain associated with the 2D image; a chromatic aberration; a weather condition; a direction of a light source; or a lens or color effect; modifying the synthetic image data applied to the reference 3D model, wherein the modification is based on the determined scene effect; and rendering the photorealistic image using the modified synthetic image data applied to the reference 3D model.

Example 7 is the computer-implemented method of examples 1-6, wherein the reference 3D model represents the identified portion of the physical structure depicted in the 2D image only, as opposed to modeling an entirety of the physical structure.

Example 8 is a system, comprising: one or more processors; and a non-transitory computer-readable storage medium containing instructions which, when executed on the one or more processors, cause the one or more processors to perform operations including: receiving a two-dimensional (2D) image and metadata, the 2D image including a set of pixels depicting a physical structure captured by an image capturing device, and the metadata representing one or more characteristics of the image capturing device; identifying a portion of the 2D image to augment with synthetic image data; generating a reference 3D model of the physical structure from the 2D image, the reference 3D model representing the identified portion of the 2D image in a virtual space, and the generation including determining a 3D orientation of a 3D planar surface of the reference 3D model; applying the synthetic image data onto the reference 3D model; and rendering a photorealistic image using the 2D image, the metadata, and the synthetic image data applied to the reference 3D model, the photorealistic image depicting the physical structure augmented by the synthetic image data at the identified portion of the 2D image.

Example 9 is the system of example 8, wherein generating the reference 3D model further comprises: inputting the 2D image into a trained machine-learning model, the trained machine-learning model having been trained to generate the reference 3D model using the 2D image; and generating, based on an output of the trained machine-learning model, the reference 3D model to represent the identified portion of the 2D image in the virtual space, wherein the reference 3D model is an untextured block or planar representation of the physical structure.

Example 10 is the system of examples 8-9, wherein determining the 3D orientation of the 3D planar surface further comprises: segmenting the set of pixels of the 2D image into one or more subsets of pixels, the segmentation being based on an attribute of each pixel of the set of pixels; identifying, from amongst the one or more subsets of pixels, a subset of pixels that corresponds to the identified portion of the 2D image; extracting a plurality of lines from the identified subset of pixels; classifying, using a trained machine-learning model, each of the plurality of lines as a structural feature of the physical structure; determining that an angular difference between two classified lines is a predetermined angle, the two classified lines forming the 3D planar surface; computing a cross product of the two classified lines to generate a surface normal of the 3D planar surface; comparing the surface normal of the 3D planar surface with a vertical vector associated with the 2D image to determine a pitch of the 3D planar surface; warping the synthetic image data according to the pitch of the 3D planar surface; and replacing the subset of pixels that corresponds to the identified portion of the 2D image with the warped synthetic image data.

Example 11 is the system of examples 8-10, wherein generating the reference 3D model further comprises: extracting one or more lines from the set of pixels of the 2D image; building a virtual wire frame in the virtual space using the extracted one or more lines, the virtual wire frame representing one or more edges of the physical structure; identifying a portion of the virtual wire frame that corresponds to the identified portion of the 2D image; and supplementing the portion of the virtual wire frame with the synthetic image data.

Example 12 is the system of examples 8-11, wherein the image capturing device is a Light Detecting and Ranging (LiDAR) depth camera, and wherein generating the 3D model further comprises: generating a 3D point cloud using the LiDAR depth camera; identifying a portion of the 3D point cloud that models the identified portion of the 2D image, the portion of the 3D point cloud being characterized by a surface orientation; identifying three 3D points from amongst the 3D point cloud, each of the three 3D points being associated with a vector; computing a cross product of vectors between the three 3D points, the cross product resulting in a surface normal of the identified portion of the 3D point cloud; determining a 3D surface orientation of the identified portion of the 3D point cloud, the 3D surface orientation being determined using the surface normal; retrieving one or more image swatches; and warping each image swatch of the one or more image swatches according to the surface orientation of the portion of the 3D point cloud.

Example 13 is the system of examples 8-12, wherein rendering the photorealistic image further comprises: determining a scene effect associated with the 2D image by detecting at least one of the following from the 2D image or the metadata: a color cast from the 2D image; a film grain associated with the 2D image; a chromatic aberration; a weather condition; a direction of a light source; or a lens or color effect; modifying the synthetic image data applied to the reference 3D model, wherein the modification is based on the determined scene effect; and rendering the photorealistic image using the modified synthetic image data applied to the reference 3D model.

Example 14 is the system of examples 8-13, wherein the reference 3D model represents the identified portion of the physical structure depicted in the 2D image only, as opposed to modeling an entirety of the physical structure.

Example 15 is a computer-program product tangibly embodied in a non-transitory machine-readable storage medium, including instructions configured to cause a processing apparatus to perform operations including: receiving a two-dimensional (2D) image and metadata, the 2D image including a set of pixels depicting a physical structure captured by an image capturing device, and the metadata representing one or more characteristics of the image capturing device; identifying a portion of the 2D image to augment with synthetic image data; generating a reference 3D model of the physical structure from the 2D image, the reference 3D model representing the identified portion of the 2D image in a virtual space, and the generation including determining a 3D orientation of a 3D planar surface of the reference 3D model; applying the synthetic image data onto the reference 3D model; and rendering a photorealistic image using the 2D image, the metadata, and the synthetic image data applied to the reference 3D model, the photorealistic image depicting the physical structure augmented by the synthetic image data at the identified portion of the 2D image.

Example 16 is the computer-program product of example 15, wherein generating the reference 3D model further comprises: inputting the 2D image into a trained machine-learning model, the trained machine-learning model having been trained to generate the reference 3D model using the 2D image; and generating, based on an output of the trained machine-learning model, the reference 3D model to represent the identified portion of the 2D image in the virtual space, wherein the reference 3D model is an untextured block or planar representation of the physical structure.

Example 17 is the computer-program product of examples 15-16, wherein determining the 3D orientation of the 3D planar surface further comprises: segmenting the set of pixels of the 2D image into one or more subsets of pixels, the segmentation being based on an attribute of each pixel of the set of pixels; identifying, from amongst the one or more subsets of pixels, a subset of pixels that corresponds to the identified portion of the 2D image; extracting a plurality of lines from the identified subset of pixels; classifying, using a trained machine-learning model, each of the plurality of lines as a structural feature of the physical structure; determining that an angular difference between two classified lines is a predetermined angle, the two classified lines forming the 3D planar surface; computing a cross product of the two classified lines to generate a surface normal of the 3D planar surface; comparing the surface normal of the 3D planar surface with a vertical vector associated with the 2D image to determine a pitch of the 3D planar surface; warping the synthetic image data according to the pitch of the 3D planar surface; and replacing the subset of pixels that corresponds to the identified portion of the 2D image with the warped synthetic image data.

Example 18 is the computer-program product of examples 15-17, wherein generating the reference 3D model further comprises: extracting one or more lines from the set of pixels of the 2D image; building a virtual wire frame in the virtual space using the extracted one or more lines, the virtual wire frame representing one or more edges of the physical structure; identifying a portion of the virtual wire frame that corresponds to the identified portion of the 2D image; and supplementing the portion of the virtual wire frame with the synthetic image data.

Example 19 is the computer-program product of examples 15-18, wherein the image capturing device is a Light Detecting and Ranging (LiDAR) depth camera, and wherein generating the 3D model further comprises: generating a 3D point cloud using the LiDAR depth camera; identifying a portion of the 3D point cloud that models the identified portion of the 2D image, the portion of the 3D point cloud being characterized by a surface orientation; identifying three 3D points from amongst the 3D point cloud, each of the three 3D points being associated with a vector; computing a cross product of vectors between the three 3D points, the cross product resulting in a surface normal of the identified portion of the 3D point cloud; determining a 3D surface orientation of the identified portion of the 3D point cloud, the 3D surface orientation being determined using the surface normal; retrieving one or more image swatches; and warping each image swatch of the one or more image swatches according to the surface orientation of the portion of the 3D point cloud.

Example 20 is the computer-program product of examples 15-19, wherein rendering the photorealistic image further comprises: determining a scene effect associated with the 2D image by detecting at least one of the following from the 2D image or the metadata: a color cast from the 2D image; a film grain associated with the 2D image; a chromatic aberration; a weather condition; a direction of a light source; or a lens or color effect; modifying the synthetic image data applied to the reference 3D model, wherein the modification is based on the determined scene effect; and rendering the photorealistic image using the modified synthetic image data applied to the reference 3D model.

What is claimed is:

1. A computer-implemented method, comprising:
receiving a two-dimensional (2D) image and metadata, the 2D image including a set of pixels depicting a physical structure captured by an image capturing device, and the metadata representing one or more characteristics of the image capturing device;
identifying a portion of the 2D image to augment with synthetic image data;
segmenting the set of pixels of the 2D image into one or more subsets of pixels;
identifying, from amongst the one or more subsets of pixels, a subset of pixels corresponding to the identified portion of the 2D image;
generating a reference three-dimensional (3D) model of the physical structure from the 2D image, the reference 3D model representing the identified portion of the 2D image in a virtual space, and the generation including determining a 3D orientation of a 3D planar surface of the reference 3D model, wherein determining the 3D orientation comprises:
associating the 3D planar surface with the identified portion of the 2D image to augment with the synthetic image data;
extracting a surface normal value of the identified portion of the 2D image; and
orienting the reference 3D model to align the 3D planar surface according to the extracted surface normal;
applying the synthetic image data onto the reference 3D model;

reprojecting a select 3D geometry of the reference 3D model with the synthetic image data over the portion of the 2D image according to the identified subset of pixels; and rendering a photorealistic image using the 2D image, the metadata, and the reprojected selected 3D geometry with the synthetic image data.

2. The computer-implemented method of claim 1, wherein generating the reference 3D model further comprises:

inputting the 2D image into a trained machine-learning model, the trained machine-learning model having been trained to generate the reference 3D model using the 2D image; and generating, based on an output of the trained machine-learning model, the reference 3D model to represent the identified portion of the 2D image in the virtual space, wherein the reference 3D model is an untextured block or planar representation of the physical structure.

3. The computer-implemented method of claim 1, wherein extracting a surface normal value of the identified portion of the 2D image further comprises:

extracting a plurality of lines from the subset of pixels corresponding to the identified portion of the 2D image;

classifying, using a trained machine-learning model, each of the plurality of lines as a structural feature of the physical structure;

determining an angular difference between two classified lines is a predetermined angle, the two classified lines forming the 3D planar surface; and computing a cross product of the two classified lines to generate a surface normal of the 3D planar surface.

4. The computer-implemented method of claim 1, wherein generating the reference 3D model further comprises:

extracting one or more lines from the set of pixels of the 2D image;

building a virtual wire frame in the virtual space using the extracted one or more lines, the virtual wire frame representing one or more edges of the physical structure;

identifying a portion of the virtual wire frame that corresponds to the identified portion of the 2D image; and supplementing the portion of the virtual wire frame with the synthetic image data.

5. The computer-implemented method of claim 1, wherein the image capturing device is a Light Detecting and Ranging (LiDAR) depth camera, and wherein generating the 3D model further comprises:

generating a 3D point cloud using the LiDAR depth camera;

identifying a portion of the 3D point cloud that models the identified portion of the 2D image, the portion of the 3D point cloud being characterized by a surface orientation;

identifying three 3D points from amongst the 3D point cloud, each of the three 3D points being associated with a vector;

computing a cross product of vectors between the three 3D points, the cross product resulting in a surface normal of the identified portion of the 3D point cloud;

determining a 3D surface orientation of the identified portion of the 3D point cloud, the 3D surface orientation being determined using the surface normal;

retrieving one or more image swatches; and warping each image swatch of the one or more image swatches according to the surface orientation of the portion of the 3D point cloud.

6. The computer-implemented method of claim 1, wherein rendering the photorealistic image further comprises:

determining a scene effect associated with the 2D image by detecting at least one of the following from the 2D image or the metadata:
a color cast from the 2D image;
a film grain associated with the 2D image;
a chromatic aberration;
a weather condition;
a direction of a light source; or
a lens or color effect;

modifying the synthetic image data applied to the reference 3D model, wherein the modification is based on the determined scene effect; and rendering the photorealistic image using the modified synthetic image data applied to the reference 3D model.

7. The computer-implemented method of claim 1, wherein the reference 3D model represents the identified portion of the physical structure depicted in the 2D image only, as opposed to modeling an entirety of the physical structure.

8. A system, comprising:

one or more processors; and a non-transitory computer-readable storage medium containing instructions which, when executed on the one or more processors, cause the one or more processors to perform operations including:

receiving a two-dimensional (2D) image and metadata, the 2D image including a set of pixels depicting a physical structure captured by an image capturing device, and the metadata representing one or more characteristics of the image capturing device;

identifying a portion of the 2D image to augment with synthetic image data;

segmenting the set of pixels of the 2D image into one or more subsets of pixels;

identifying, from amongst the one or more subsets of pixels, a subset of pixels corresponding to the identified portion of the 2D image;

generating a reference three-dimensional (3D) model of the physical structure from the 2D image, the reference 3D model representing the identified portion of the 2D image in a virtual space, and the generation including determining a 3D orientation of a 3D planar surface of the reference 3D model, wherein determining the 3D orientation comprises:

associating the 3D planar surface with the identified portion of the 2D image to augment with the synthetic image data;

extracting a surface normal value of the identified portion of the 2D image; and orienting the reference 3D model to align the 3D planar surface according to the extracted surface normal;

applying the synthetic image data onto the reference 3D model;

reprojecting a select 3D geometry of the reference 3D model with the synthetic image data over the portion of the 2D image according to the identified subset of pixels; and rendering a photorealistic image using the 2D image, the metadata, and the reprojected selected 3D geometry with the synthetic image data.

9. The system of claim 8, wherein generating the reference 3D model further comprises:
  inputting the 2D image into a trained machine-learning model, the trained machine-learning model having been trained to generate the reference 3D model using the 2D image; and
  generating, based on an output of the trained machine-learning model, the reference 3D model to represent the identified portion of the 2D image in the virtual space, wherein the reference 3D model is an untextured block or planar representation of the physical structure.

10. The system of claim 8, wherein determining the 3D orientation of the 3D planar surface further comprises:
  extracting a plurality of lines from the identified subset of pixels;
  classifying, using a trained machine-learning model, each of the plurality of lines as a structural feature of the physical structure;
  determining that an angular difference between two classified lines is a predetermined angle, the two classified lines forming the 3D planar surface;
  computing a cross product of the two classified lines to generate a surface normal of the 3D planar surface; and
  comparing the surface normal of the 3D planar surface with a vertical vector associated with the 2D image to determine a pitch of the 3D planar surface.

11. The system of claim 8, wherein generating the reference 3D model further comprises:
  extracting one or more lines from the set of pixels of the 2D image;
  building a virtual wire frame in the virtual space using the extracted one or more lines, the virtual wire frame representing one or more edges of the physical structure;
  identifying a portion of the virtual wire frame that corresponds to the identified portion of the 2D image; and
  supplementing the portion of the virtual wire frame with the synthetic image data.

12. The system of claim 8, wherein the image capturing device is a Light Detecting and Ranging (LiDAR) depth camera, and wherein generating the 3D model further comprises:
  generating a 3D point cloud using the LiDAR depth camera;
  identifying a portion of the 3D point cloud that models the identified portion of the 2D image, the portion of the 3D point cloud being characterized by a surface orientation;
  identifying three 3D points from amongst the 3D point cloud, each of the three 3D points being associated with a vector;
  computing a cross product of vectors between the three 3D points, the cross product resulting in a surface normal of the identified portion of the 3D point cloud;
  determining a 3D surface orientation of the identified portion of the 3D point cloud, the 3D surface orientation being determined using the surface normal;
  retrieving one or more image swatches; and
  warping each image swatch of the one or more image swatches according to the surface orientation of the portion of the 3D point cloud.

13. The system of claim 8, wherein rendering the photorealistic image further comprises:
  determining a scene effect associated with the 2D image by detecting at least one of the following from the 2D image or the metadata:
    a color cast from the 2D image;
    a film grain associated with the 2D image;
    a chromatic aberration;
    a weather condition;
    a direction of a light source; or
    a lens or color effect;
  modifying the synthetic image data applied to the reference 3D model, wherein the modification is based on the determined scene effect; and
  rendering the photorealistic image using the modified synthetic image data applied to the reference 3D model.

14. The system of claim 8, wherein the reference 3D model represents the identified portion of the physical structure depicted in the 2D image only, as opposed to modeling an entirety of the physical structure.

15. A computer-program product tangibly embodied in a non-transitory machine-readable storage medium, including instructions configured to cause a processing apparatus to perform operations including:
  receiving a two-dimensional (2D) image and metadata, the 2D image including a set of pixels depicting a physical structure captured by an image capturing device, and the metadata representing one or more characteristics of the image capturing device;
  identifying a portion of the 2D image to augment with synthetic image data;
  segmenting the set of pixels of the 2D image into one or more subsets of pixels;
  identifying, from amongst the one or more subsets of pixels, a subset of pixels corresponding to the identified portion of the 2D image;
  generating a reference three-dimensional (3D) model of the physical structure from the 2D image, the reference 3D model representing the identified portion of the 2D image in a virtual space, and the generation including determining a 3D orientation of a 3D planar surface of the reference 3D model, wherein determining the 3D orientation comprises:
    associating the 3D planar surface with the identified portion of the 2D image to augment with the synthetic image data;
    extracting a surface normal value of the identified portion of the 2D image; and
    orienting the reference 3D model to align the 3D planar surface according to the extracted surface normal;
  applying the synthetic image data onto the reference 3D model;
  reprojecting a select 3D geometry of the reference 3D model with the synthetic image data over the portion of the 2D image according to the identified subset of pixels; and
  rendering a photorealistic image using the 2D image, the metadata, and the reprojected selected 3D geometry with the synthetic image data.

16. The computer-program product of claim 15, wherein generating the reference 3D model further comprises:
  inputting the 2D image into a trained machine-learning model, the trained machine-learning model having been trained to generate the reference 3D model using the 2D image; and
  generating, based on an output of the trained machine-learning model, the reference 3D model to represent the identified portion of the 2D image in the virtual space, wherein the reference 3D model is an untextured block or planar representation of the physical structure.

17. The computer-program product of claim 15, wherein determining the 3D orientation of the 3D planar surface further comprises:

extracting a plurality of lines from the identified subset of pixels;

classifying, using a trained machine-learning model, each of the plurality of lines as a structural feature of the physical structure;

determining that an angular difference between two classified lines is a predetermined angle, the two classified lines forming the 3D planar surface;

computing a cross product of the two classified lines to generate a surface normal of the 3D planar surface; and comparing the surface normal of the 3D planar surface with a vertical vector associated with the 2D image to determine a pitch of the 3D planar surface.

18. The computer-program product of claim 15, wherein generating the reference 3D model further comprises:

extracting one or more lines from the set of pixels of the 2D image;

building a virtual wire frame in the virtual space using the extracted one or more lines, the virtual wire frame representing one or more edges of the physical structure;

identifying a portion of the virtual wire frame that corresponds to the identified portion of the 2D image; and supplementing the portion of the virtual wire frame with the synthetic image data.

19. The computer-program product of claim 15, wherein the image capturing device is a Light Detecting and Ranging (LiDAR) depth camera, and wherein generating the 3D model further comprises:

generating a 3D point cloud using the LiDAR depth camera;

identifying a portion of the 3D point cloud that models the identified portion of the 2D image, the portion of the 3D point cloud being characterized by a surface orientation;

identifying three 3D points from amongst the 3D point cloud, each of the three 3D points being associated with a vector;

computing a cross product of vectors between the three 3D points, the cross product resulting in a surface normal of the identified portion of the 3D point cloud;

determining a 3D surface orientation of the identified portion of the 3D point cloud, the 3D surface orientation being determined using the surface normal;

retrieving one or more image swatches; and warping each image swatch of the one or more image swatches according to the surface orientation of the portion of the 3D point cloud.

20. The computer-program product of claim 15, wherein rendering the photorealistic image further comprises:

determining a scene effect associated with the 2D image by detecting at least one of the following from the 2D image or the metadata:
  a color cast from the 2D image;
  a film grain associated with the 2D image;
  a chromatic aberration;
  a weather condition;
  a direction of a light source; or
  a lens or color effect;

modifying the synthetic image data applied to the reference 3D model, wherein the modification is based on the determined scene effect; and rendering the photorealistic image using the modified synthetic image data applied to the reference 3D model.

* * * * *